(12) United States Patent
Becker et al.

(10) Patent No.: US 11,692,323 B2
(45) Date of Patent: Jul. 4, 2023

(54) MOLDED CONCRETE BLOCK HAVING VISUALLY ENHANCED CONTRASTING SURFACE SECTIONS; METHODS, AND USE

(71) Applicant: ANCHOR WALL SYSTEMS, INC., Minnetonka, MN (US)

(72) Inventors: Christopher W. Becker, Prescott, WI (US); Glenn C. Bolles, Edina, MN (US); Jay J. Johnson, Star Prairie, WI (US); Jonathan M. Schlueter, Medina, MN (US); Robert B. Burnquist, Chaska, MN (US); Steven P. Bennett, Coon Rapids, MN (US)

(73) Assignee: Anchor Wall Systems, Inc., Minnetonka, MN (US)

( * ) Notice: Subject to any disclaimer, the term of this patent is extended or adjusted under 35 U.S.C. 154(b) by 842 days.

(21) Appl. No.: 16/631,327

(22) PCT Filed: Jul. 23, 2018

(86) PCT No.: PCT/US2018/043299
§ 371 (c)(1),
(2) Date: Jan. 15, 2020

(87) PCT Pub. No.: WO2019/023134
PCT Pub. Date: Jan. 31, 2019

(65) Prior Publication Data
US 2020/0217036 A1     Jul. 9, 2020

Related U.S. Application Data

(60) Provisional application No. 62/536,336, filed on Jul. 24, 2017.

(51) Int. Cl.
*E02D 17/20* (2006.01)
*B05D 1/02* (2006.01)
(Continued)

(52) U.S. Cl.
CPC ............ *E02D 17/205* (2013.01); *B05B 12/28* (2018.02); *B05D 1/02* (2013.01); *B28B 11/001* (2013.01);
(Continued)

(58) Field of Classification Search
CPC ... B05B 12/28; B05B 13/0447; B28B 11/001; B28B 11/048; C04B 41/4543
See application file for complete search history.

(56) References Cited

U.S. PATENT DOCUMENTS

| 978,984 A | 12/1910 | Burdick |
|---|---|---|
| 3,939,238 A | 2/1976 | Salts |

(Continued)

FOREIGN PATENT DOCUMENTS

| DE | 20 20 941 A1 | 11/1971 |
|---|---|---|
| GB | 1 562 715 A | 3/1980 |

(Continued)

OTHER PUBLICATIONS

Besser Co., Founders Spray Machine, brochure, 2 pages of unknown date; and webpage from http//www.besser.com/equipment/productenhance/founderspray.htm, 2 pages, printed Jun. 2002.
(Continued)

*Primary Examiner* — Nathan T Leong
(74) *Attorney, Agent, or Firm* — Merchant & Gould P.C.

(57) ABSTRACT

According to the present disclosure, methods and techniques for generating preferred concrete block products are provided. The methods and techniques involve providing addition of color to selected section within the blocks (1), as described herein, to generate enhancement effects. Typical applications involve spray applications for color pigment to visually distinct sections of the block (1) on one or more decorative surfaces.

14 Claims, 13 Drawing Sheets

(51) Int. Cl.
  *B28B 11/04* (2006.01)
  *E04C 1/00* (2006.01)
  *B05B 12/28* (2018.01)
  *B28B 11/00* (2006.01)
  *C04B 41/45* (2006.01)
  *B05B 13/04* (2006.01)

(52) U.S. Cl.
  CPC ........ *B28B 11/048* (2013.01); *C04B 41/4543* (2013.01); *E04C 1/00* (2013.01); *B05B 13/0447* (2013.01)

(56) References Cited

U.S. PATENT DOCUMENTS

| | | |
|---|---|---|
| 4,260,352 A | 4/1981 | Balhorn |
| 5,038,714 A | 8/1991 | Dye et al. |
| 5,183,616 A | 2/1993 | Hedrick |
| 5,942,181 A | 8/1999 | Rondeau |
| 6,257,865 B1 | 7/2001 | Rondeau |
| 6,910,796 B2 | 6/2005 | Bailey et al. |
| 8,128,851 B2 * | 3/2012 | Scherer .................. B28B 7/007 264/293 |
| 2003/0126821 A1 * | 7/2003 | Scherer ................. B28B 7/0097 405/286 |

FOREIGN PATENT DOCUMENTS

| | | | |
|---|---|---|---|
| JP | H09-254123 A | | 9/1997 |
| JP | H09254123 | * | 9/1997 |

OTHER PUBLICATIONS

International Search Report and Written Opinion of the International Searching Authority for International Patent Application No. PCT/US2018/043299 dated Oct. 11, 2018, 15 pages.

\* cited by examiner

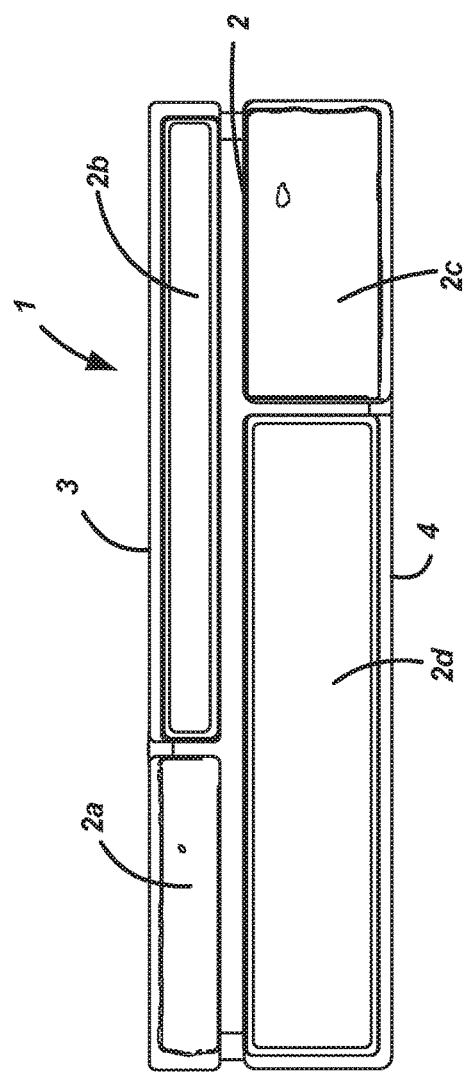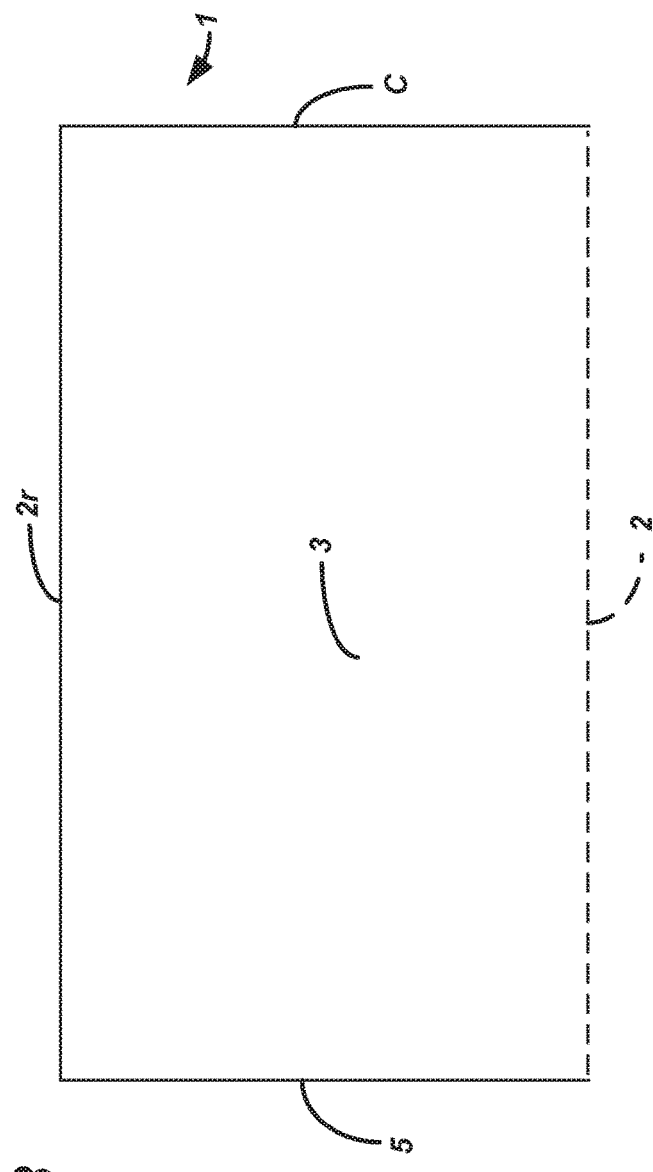

MOLDED CONCRETE BLOCK HAVING VISUALLY ENHANCED CONTRASTING SURFACE SECTIONS; METHODS, AND USE

This application is a National Stage Application of PCT/US2018/043299, filed on Jul. 23, 2018, which claims priority to U.S. Provisional Patent Application No. 62/536,336, filed Jul. 24, 2017, the disclosures of which are hereby incorporated by reference herein in their entireties. To the extent appropriate, a claim of priority is made to the above-disclosed application.

FIELD OF THE DISCLOSURE

The present disclosure relates generally to a technique for applying an artificial surface colorant to selected portions of adjacent faces (such as, for example, a top face and an adjacent end face) of a target article. More particularly, the present disclosure relates to the use of this colorization technique to achieve unique color effects on selected portions of such faces of an article made of concrete (such as, for example, a concrete masonry unit, a concrete segmental retaining wall unit, a concrete paving stone, a concrete paving slab, a concrete tile, or a thin manufactured stone masonry veneer unit made of concrete, and the like, all of which are generally referred to hereinafter as "blocks of concrete" or "concrete blocks"). The present disclosure also describes equipment for practicing this colorization technique in a high-speed, mass production, dry-cast plant of a type that is commonly used to manufacture such blocks of concrete.

BACKGROUND

Concrete blocks formed with decorative faces are used in a variety of applications. Examples include: retaining walls; interior and exterior building walls; and sidewalk, patio and terrace surfaces.

General approaches to making decoratively-faced concrete blocks for use in such applications are described in U.S. Pat. No. 8,128,851, which is incorporated herein by reference. These approaches concern, generally, making such blocks by a dry-cast process. In a dry-cast process, a zero- or low-slump concrete mixture comprising sand, aggregates, cementitious material and a relatively small amount of water is placed into a mold, a decorative surface is generated on the mixture while it is in the mold, and the mixture is subjected to vibration to densify it within the mold into the desired configuration. The densified, but unhardened unit (which is sometimes referred to in this disclosure as a "green block" or an "uncured block") is then immediately de-molded and transported to a curing location where it is allowed to harden. A typical "big board" dry-casting machine has a pallet size on the order of 15 sq. ft., and can densify and demold a mass of uncured concrete having almost this much face area at least as fast as once every 90 seconds, and often faster, (depending upon the thickness of the molded article(s), whether or not the molded articles comprise more than one ply of concrete material (e.g., a "face mix" ply over a "base mix" ply), whether or not decorative contours are formed on one or more faces of the concrete articles, whether or not the side faces of the concrete articles are vertical, or have inclines or undercuts, etc.). It is not uncommon for such big board dry-cast machines to cycle on the order of once every 25 seconds. Smaller board machines, such as, for example "3@Time" block machines typically cycle once every 10 seconds. So the dry-cast process is particularly suited for high-speed, mass production of concrete blocks that have a very high degree of density, strength, and dimensional accuracy.

In many instances, an object for the use of the blocks is to generate a structure that has a decorative surface simulating construction from individual stone pieces or other pieces joined together by a (stone) masonry process. Examples are described in U.S. Pat. No. 8,128,851. They may include forming individual concrete blocks with decorative faces that included discrete "false stone" sections each having a decorative stone-like face; and, with grooves (false joints) separating those sections, to mimic (emulate) masonry joints and/or mortar.

One of the drawbacks of the dry-cast process, particularly in a mass-production setting, is that it is not well-suited to generating decorative faces comprising precisely-placed and subtly attenuated color variations within individual "false stone" sections or "false joint" sections. The present disclosure relates to techniques and enhancements to facilitate generation of molded concrete blocks with decorative faces that comprise such precisely-placed and subtly attenuated color variations, on both the tops and ends (as made) of such articles.

SUMMARY

According to the present disclosure methods and techniques for generating preferred concrete block products are provided. The methods and techniques involve providing addition of color to selected sections within the blocks, as described herein, to generate enhancement effects. Typical instances involve spray application of color pigment to visually distinct sections of the demolded, uncured block on one or more decorative surfaces, through a stencil that is offset from—that is, not in contact with—the target surface(s).

The disclosure also involves provision of blocks having such enhancements; and, the use of such block in wall structures.

Preferred compositions and application approaches to generate the color variations desired, are described. Also described are techniques to enhance the color effect, through fading and similar approaches.

BRIEF DESCRIPTION OF THE DRAWINGS

FIG. 2 is a schematic plan view of the block of FIG. 1, taken toward a decorative face.

FIG. 3 is a schematic top plan view of the block of FIGS. 1 and 2.

DETAILED DESCRIPTION

I. General

A. Molded Concrete Blocks—Generally

Figure 1:
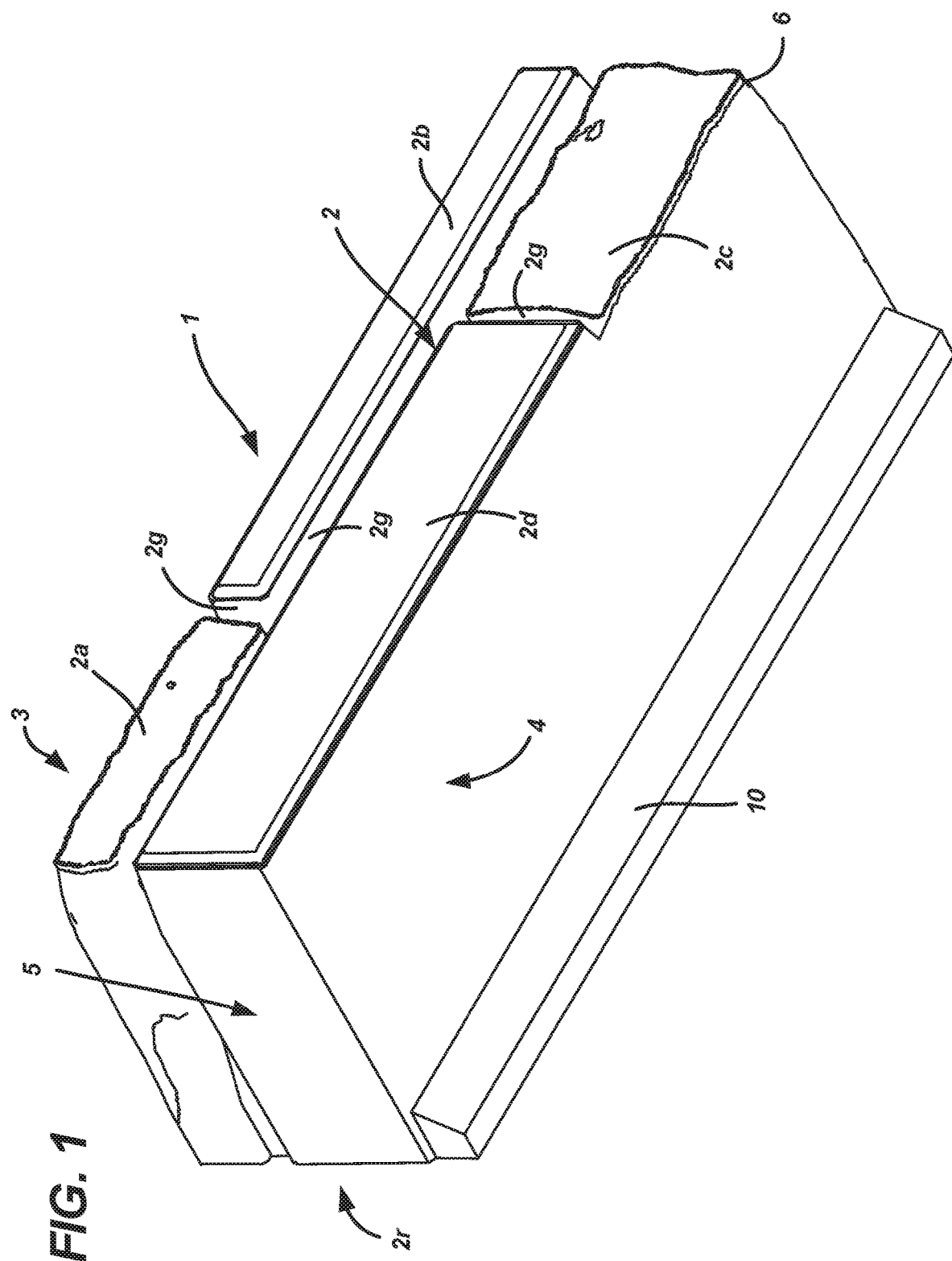
FIG. 1 is a schematic, bottom perspective view (in use) of a molded block, in accord with the present disclosure.

While the techniques described herein were particularly developed for use with concrete blocks made by a dry-cast process, various ones of the techniques described can be applied to concrete blocks formed by wet cast processes, concrete press processes, concrete extrusion processes, 3D concrete printing processes, and other processes.

The concrete blocks of particular interest here are generally ones that are mass-produced, and are molded having at least one face or face section molded into a configuration such that the block can be used, together with other such blocks, to create a structure that simulates a wall or wall section made from stone masonry, i.e. to simulate the appearance of many discrete and differentiated stone pieces secured to one another with mortar or similar material. To facilitate this, the blocks are molded with a face or face section that has: visually distinct section(s) with features emulating stone pieces (false stone sections); and, various grooves between those distinct sections that simulate the appearance of joints and/or mortar sections between individual stones (false joints), in spite of the blocks actually having an integral structure and not comprising individual pieces. The blocks can also have a face or face section with various other types of topology to give a craggy appearance, or other types of three-dimensional (positive/negative topology) features, molded in to create a visually attractive appearance. Techniques applicable to mold such blocks are known. In the context of dry-cast concrete blocks, the molding techniques are described, for example, in U.S. Pat. No. 8,128,851, incorporated herein by reference.

Herein, the terms "molded block", "molded block unit" and variants thereof, are meant to refer to a single unitary molded block structure, without specific regard to the method of manufacture (other than molding having been used). The term "dry-cast concrete block" and variants thereof, is meant to specifically reference a block that has been made from a dry-cast concrete process as opposed to a wet-cast concrete process.

The term "green block", "uncured block", "molded unit of uncured concrete", or "molded mass of uncured concrete" is meant to refer to a block formed by molding, but prior to having been fully dried or cured. It may also be sometimes referred to as a "predecessor to a concrete unit."

B. Concrete Blocks Enhanced Through Provision of Visually Contrasting Surface Sections—Generally In accord with the present disclosure, concrete blocks with visually contrasting surface sections are provided. In general, the visually contrasting sections are created by applying contrast (i.e., colorant) to selected sections of the block, to create visually contrasting surface sections and, thus, to facilitate the appearance of a natural stone or similar sections in the block, and also in a resulting wall made with the block. This can be accomplished (in the general processes characterized below), by application of a composition including pigment or contrast agent to one or more sections or surface portion(s) of the block. Typically, the pigment or colorant agent is applied to one or more visually distinct false stone sections that themselves comprise sub-portions of the block, and which create the appearance of separate stone pieces used in the assembly of a resulting wall or other structure.

The techniques described herein can be applied in approaches in which multiple sections of contrast or color are applied to portions of the same block. In some instances, when multiple sections are used, a different contrast for a visually distinct color appearance can be provided in at least two of those sections.

C. Dry-Cast Concrete Block Formation—Generally

Again, the techniques and methods described herein were developed in particular for use in the generation of decoratively-faced concrete blocks formed by the dry-cast process. However, the techniques can be applied to concrete blocks formed by other methods, if desired.

Techniques for dry-casting concrete blocks having decorative features, such as false stone and false joint portions, configurations and textures, on one or more faces are well known; see, for example, U.S. Pat. No. 8,128,851, incorporated herein by reference. The techniques described in these references can be used to generate molded blocks suitable for applications of techniques described herein, which primarily relate to adding contrast agent (sometimes referenced as colorant or pigment) to selected portions of a block—for example a top (as made) face and/or an end (as made) face of a block—in order to create visual contrast in sections of that block, facilitating simulation of stone masonry when the block is assembled with others to build a wall, or facilitating simulation of stone paving with the block is assembled with others to build a pavement.

Once a green block (i.e., an uncured block is referred to as a "green" block) having such decorative features has been demolded, the next step in the method is a process of applying, to selected portions (typically visually distinct false stone sections) of the green block, a liquid carrier comprising the contrast agent or colorant. A variety of techniques can be used for the application; however, typically and advantageously, spraying will be used. The colorant will typically be applied in a water-based spray. Control of the location of the application of the spray to the block will typically be through use of a stencil and spray nozzle configuration, as characterized further below.

Herein, the step of applying the colorant will sometimes be referenced as being addition of color resulting from the addition of a liquid concrete sealer including pigment to at least one surface portion of block. The term "sealer" in this context is meant to reference a liquid (typically the water) that also includes colorant or pigment and appropriate seal or adhesion material; and any additional adjuvants to help locate the colorant where desired and retain it there.

Techniques according the present disclosure can be applied with commercially available concrete sealers. Such sealers have been used to enhance the properties of certain concrete surfaces in the past, often for wear advantages, weather viability etc. Both clear and color concrete sealers are known. The concrete sealers are referenced in more detail, below.

Herein when a stencil is used during the operations, typically and preferably an "offset" stencil is preferred. By the term "offset" in this context, what is meant is that the stencil that is positioned above the block(s), to which the spray is being applied, is not in contact with the block(s).

In a typical operation of the type characterized herein, the step of applying the contrast or colorant will involve using a stencil that also gets at least partially coated with spray. It is often desirable to remove any excess liquid (referenced as overspray) from the stencil, so that dripping of contrast agent onto blocks is managed and controlled. Herein, techniques are described for removal this overspray from the stencil, during and after the step of applying the contrast agent is undertaken.

Removal of the overspray from a stencil, when used, can be conducted during the step of applying the contrast agent, and also before or after the block is removed from underneath the stencil. In an example, the block sprayed is a "green" block, so the block is then moved to a curing station.

It is noted that the color application techniques described herein can be applied to cured blocks. When such is the case, there may still be a color curing step after the applied spray, but the block may otherwise have been either fully or partially cured before color application.

D. Example Block Types and Features—FIGS. 1-3

It is noted that a concrete block can be characterized by its features "as made"—that is, as the block is oriented within the mold and when removed from the "mold" on a standard dry-cast production line —; or "as installed"—that is, as the block is oriented when installed in a wall or other structure in use. Terms related to this are characterized herein, in connection with FIGS. 1-3.

The reference numeral 1, FIG. 1, generally indicates an example concrete block constructed in accord with the present disclosure. The concrete block 1 includes a face 2 referenced herein as the "a front, decorative, face" or by similar terms. This is the face of the block 1 that, when the block is used to form a structure such as a wall, decorative feature, or retaining wall, primarily faces a viewer in front of the wall. It is also preferably a face that is visually enhanced in accord with the present techniques.

Opposite face 2, is face 2r, generally referred to herein as a "rear" face. When the block 1 is made in a "dry-cast" mold process, it is typically constructed with front face 2 being directed upwardly and rear face 2r being a bottom surface or downwardly directed surface. When removed from the mold, as a green block for transportation to a curing station, the block is typically oriented resting on the machine pallet with surface 2r down (against the pallet) and face 2 up.

Blocks, such as block 1, generally include first and second opposite faces 3, 4 that, in use in a wall or other structure, are upper (surface 3) and lower (surface 4) surfaces in the resulting wall or other structure. The blocks also include opposite side ends, faces, or surfaces 5, 6; each extending between surfaces 3, 4 and surfaces 2, 2r.

The particular block 1 depicted is configured for use as a retaining wall block, and thus optionally includes a retaining offset projection or lip 10 on surface 4. It is noted that the techniques described can be applied in blocks that are constructed without a retaining projection or offset, and thus are for different purposes, such as decorative, or landscaping, but not retaining purposes. Non-limiting examples include blocks with pins or lugs.

Still referring to FIG. 1, the decorative face 2 can be seen as having visually distinct false stone sections 2a, 2b, 2c, and 2d separated by groove or false joint sections 2g. These groove sections 2g are molded sections that cause the appearance of the separate sections 2a-2d, to simulate an appearance in the face 2 of a resulting construction from a masonry process in which separate stones (the appearance of which is created by the sections 2a-2d) are joined together by mortar to form the resulting structure. Techniques for creating such sections and grooves are described for example in such references as U.S. Pat. No. 8,128,851.

Herein, visually distinct sections such as 2a, 2b, 2c and 2d will sometimes referred to as "false stone sections." By this term it is not meant to be suggested that the sections are actually separate, but rather they are sections that create the appearance of separate stones having been used in the resulting wall or other structure. Sections such as 2g will be sometimes referred to as "false mortar sections" or "false joints." By such terms it is not meant that the sections actually include mortar, but rather the molded sections that create the appearance of mortar between the false stone sections. The decorative face 2 can also have a face that does not include the visually distinct false stone sections and/or false joints; such alternative decorative faces 2 can be any of a variety of appearances including non-limiting flat faces, bumpy faces, or a combination of flat and bumpy faces with or without the use of false joints.

It is noted that in some instances portions of the sides 5, 6 can be provided with molded decorative features to facilitate the appearance of stone sections and/or mortar sections around a corner. This may be particularly desirable in blocks that are to be used as corner blocks in a retaining wall or other construction. In the example block 1 of FIG. 1, this type of appearance is intended to be indicated schematically in the opposite sides 5, 6.

In FIG. 2, a schematic plan view of surface 2 (a front ("as installed") face) of block 1 is depicted. It is noted that the view of FIG. 2 is schematic, and the optional retainer projection 10 (FIG. 1) is not depicted. This is meant to support an understanding that the projection 10 is an option and not necessarily required in various block types. Again, when the block 1 is a dry-cast block, generated in a mold and removed therefrom on a pallet, in a typical dry-cast process face 2 is upwardly directed, i.e., as an upper ("as made") face in the uncured or green block. However, when the block is used in a wall, face 2 is generally a lateral face, with surface 3 directed upwardly and surface 4 directed downwardly. Since surface 2 is the decorative face, it is generally oriented in the resulting wall or other structure toward the viewer.

FIG. 3 is a schematic plan view taken toward surface 3 of block 1. The decorative surface 2 is represented by phantom lines, to indicate that it would often have an irregular shape. It is noted that block 1, FIG. 3, is depicted having a generally rectangular shape with: a rear wall 2r, opposite surface 2; and, opposite sides 5, 6 extending at approximately right angles to surfaces 2r, 2 and generally parallel to one another. In some instances, alternatives are desirable. Indeed, sides 5, 6 can be made non-parallel to one another. For example, one or both of sides 5, 6 can be made to taper toward the other in extension from surface 2 to surface 2r. Such variations in block configurations as are known and are used to create options and variations for making structures made from the blocks.

Thus, the techniques described herein can be applied with blocks constructed with a variety of perimeter shapes, the rectangular shape and variations referenced herein merely being examples.

In a typical molding operation, multiple green blocks are made positioned adjacent one another on a machine pallet, and are generated in a mold process that creates the multiple blocks at the same time in the molding operation. The pallet having the blocks (for example, decorative faces up from a dry-cast process) is then, in a typical prior art process, moved to a curing station. Curing can be conducted in the presence of additional moisture and heat, for example, in a hot moist environment such as steam room. In some instances, curing can be conducted by simply moving the blocks to a location and allowing them to sit and cure under ambient conditions.

In accord with the present disclosure, a step is provided of visually enhancing a decorative surface 2 by applying contrast (color) to the decorative surface 2 in one or more sections, typically visually distinct, false stone sections, to enhance the visual appearance of the block and resulting in an appearance of a wall as having been formed from individually selected pieces of stone or other material. This step of providing the visual enhancement can be conducted prior to curing the green blocks, or after the green blocks have been cured or partially cured. Which approach is chosen will typically be a matter of preference for the facility involved.

When the blocks are "wet-cast", many of the color application techniques described herein can still be applied, but since they preferably involve at least some application to an upper face, the wet-cast blocks (typically molded with the decorative face down) will usually have been cured at least sufficiently to have adequate structural integrity to (after molding) be positioned with a decorated face upward.

E. An Example Block and Wall Section Having Visual Contrast in Decorative Surfaces Portions and According to the Present Disclosure—FIGS. 9 & 10

Figure 9:
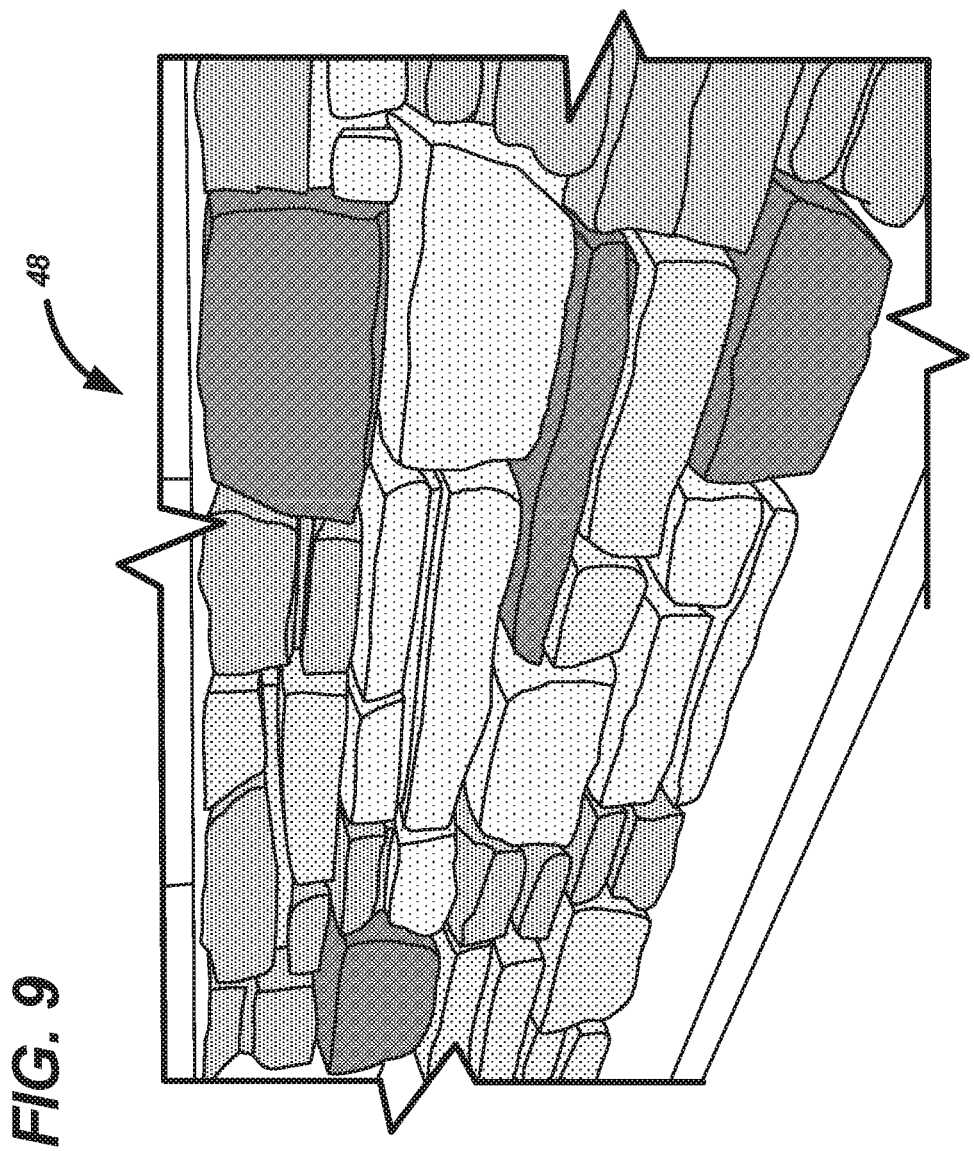
FIG. 9 is a color view of a mock-up section of decorative wall constructed with block that has been made of enhanced in accord with the present disclosure.
Figure 10:
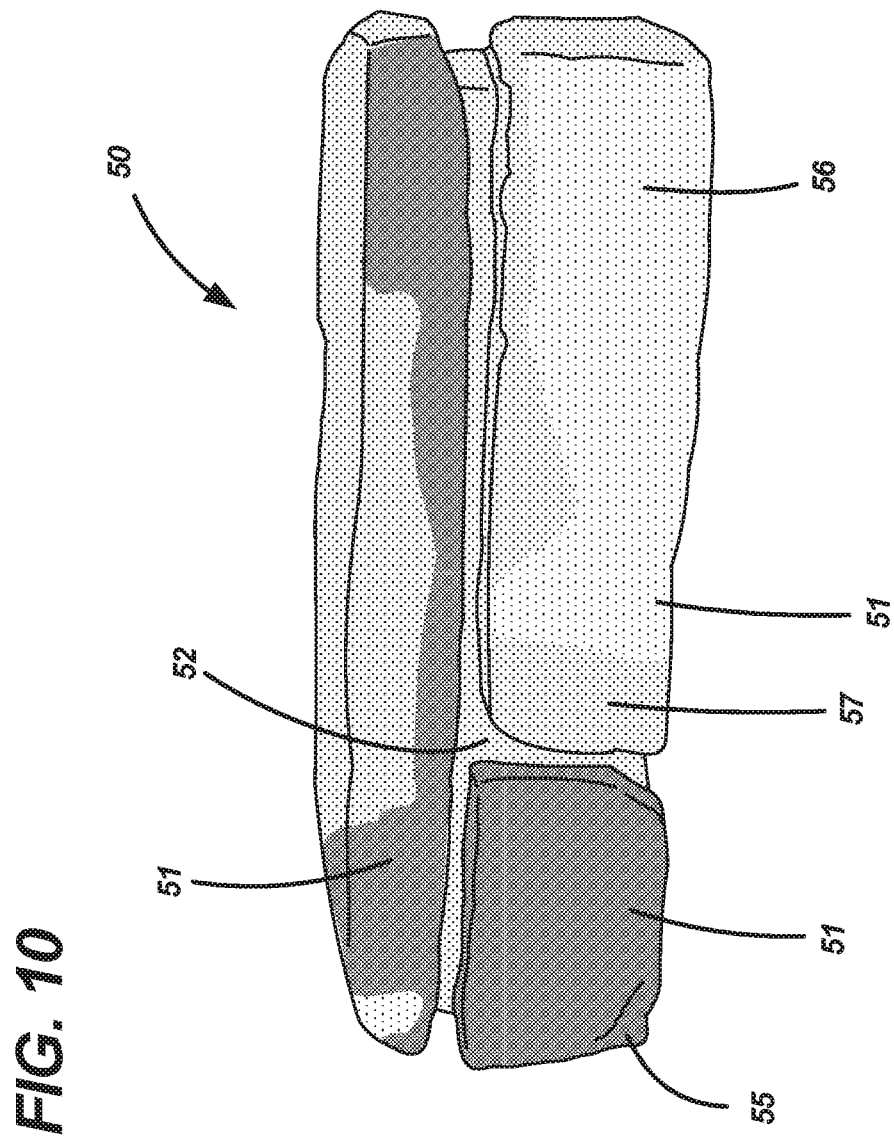
FIG. 10 is a color view of a block enhanced according to the present disclosure and usable in a decorative wall of FIG. 9.

In FIG. 9, a depiction of a mock-up wall structure constructed with enhanced blocks in accord with the present disclosure is shown at 48. FIG. 9, in the original filing of this disclosure (Ser. No. 62/536,336), is a colored depiction to enhance the appearance, and for the utility application filing of this disclosure, the blocks are not shown in color to comply with international patent standards, but they are shaded and stippled to indicate various degrees of lightness/darkness. In FIG. 9, the wall section 48 is depicted comprising a plurality of blocks. In FIG. 10, an example block usable in the wall 48 is shown at 50. The block 50 includes visually discrete false stone sections 51, separated by false mortar or joint sections 52. An example of false stone section having applied thereto a color create visual contrast is indicated by section 55. In portion 56 of the block 50, no color contrast agent has been added. Of course an alternative practice is common, different amounts of colorations or different color agents can be applied to various stone sections.

It is noted that in false stone section 57, color has not been added evenly throughout the surface. This is generated by different amounts of color agent being added at different locations by the operations used, as discussed in further detail below. Herein such variations within a selected section will sometimes referred to as "fade" or similar terms.

II. Techniques for Enhancement of Visual Contrast

A. A Typical Process for Applying Visual Contrast Agent(s), Generally—FIGS. 4-8

According to the present disclosure, and as indicated above, visual contrast material or agent (color) is applied to one or more sections of decorative face of the block, to create the effects characterized above. This can be accomplished by applying a contrast composition comprising carrier, adherent and pigment to one or more sections of the block. It can be practiced by applying different contrast compositions to different sections of the same block, as will be understood from the following.

In FIGS. 4-7, example equipment usable in a process for application of this contrast is schematically shown. In FIG. 8, a schematic depiction of equipment featured for removal of overspray resulting from the process, is provided. It is noted that in a high-speed commercial block-making operation, the equipment of FIG. 8 can be incorporated into the same equipment as the application equipment of FIGS. 4-7. FIGS. 11-14 show another embodiment of equipment that can be used for applying contrast and for removing the overspray.

B. Application of Contrast or Color—FIGS. 4-7

Figure 4:
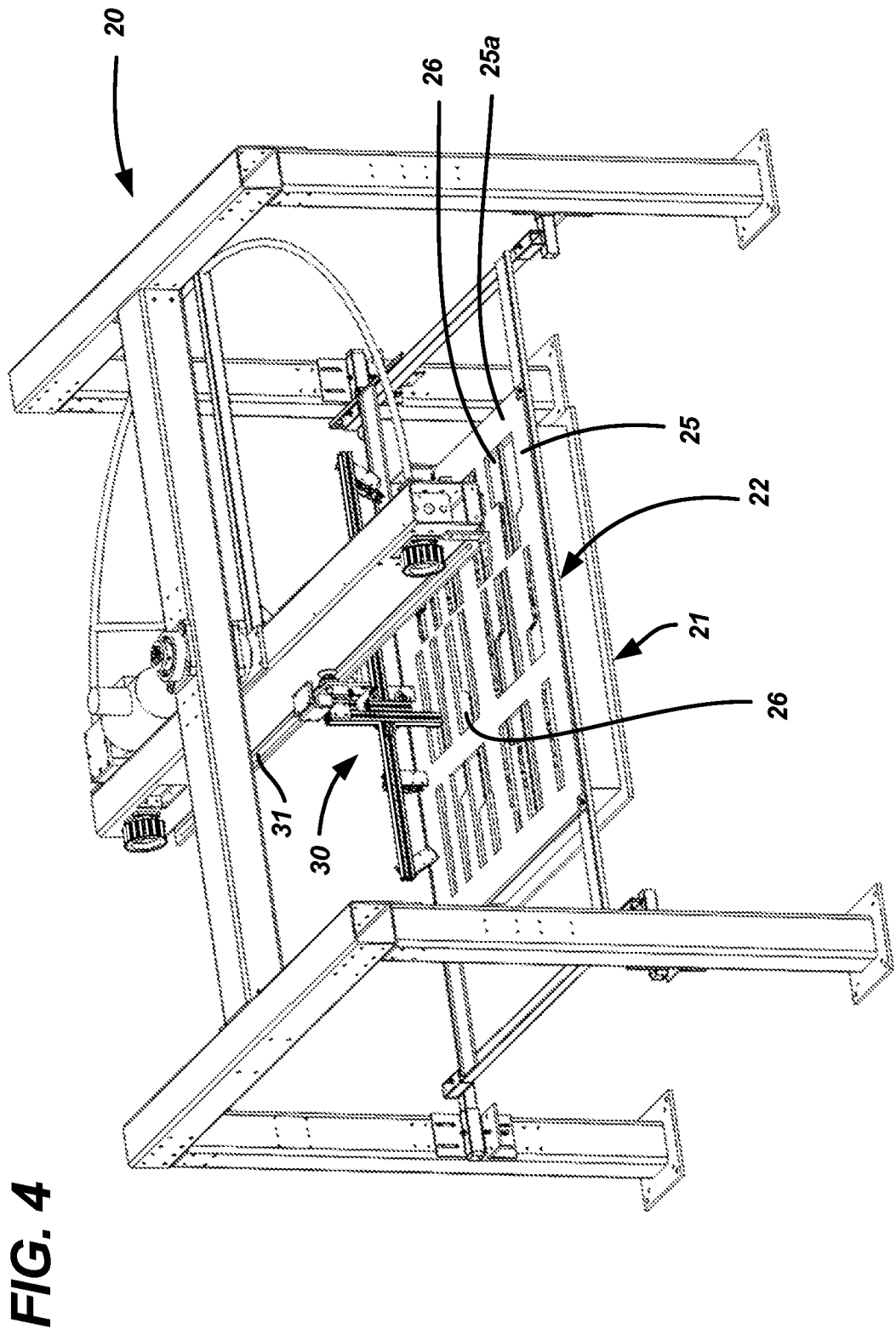
FIG. 4 is a schematic perspective view of the equipment depicting a step in a process of providing an enhanced block in accord with the techniques of the present disclosure.

As indicated above, in FIGS. 4-7, processing equipment for applying visual contrast agent to a decorative surface of blocks in a typical block manufacturing process is indicated schematically. Referring to FIG. 4, such equipment is indicated generally at 20. A pallet 21 supporting a plurality of, individual, molded blocks 22 is depicted, schematically. In a preferred process, the multiple blocks 22 are green blocks that have been molded in a molding process of a type typical for dry-cast decorative blocks, see for example U.S. Pat. No. 8,128,851. Individual blocks 22 would be positioned on the pallet 21 with the front, decorative, faces of each block directed upwardly. In a preferred process, the colorant application station comprising assembly 20 is situated "in line" between a dry-cast molding station (not shown) and a curing station (also not shown), so that pallets 21 of blocks 22 are successively conveyed (by equipment not shown) from the molding station to the colorant application station, and then to racks for curing. In another preferred process, the colorant application station comprising assembly 20 is situated "in line" between a curing station (not shown) and a cubing station (also not shown), so that cured blocks are conveyed (by equipment not shown) into the color application station, and then to the cuber. In other arrangements, the colorant application station can be located "off line" so that cured blocks can be transported to it, for example, from a block storage yard, rather than directly from a molding station or a curing station.

Control of the application of the contrast agent, is provided, in part, by a stencil arrangement 25. The stencil arrangement 25 has various apertures 26 therein, at desired locations where contrast agent is meant to reach selected portions of underlying blocks 22. Solid portions of the stencil 25, then, are surfaces where applied agent would not reach the block, but rather will be retained on the stencil 25. In some alternative processes, the stencil may be omitted. When the stencil is omitted, entire faces can have colorant applied, and can include techniques to achieve, for example, a fade across the surface of the face.

As indicated previously, typically and preferably the stencil process will involve use of an "offset stencil". By the term "offset" in this context, it is meant that the stencil 25 is not in contact with the individual blocks 22 underneath. Providing space between the two facilitates application of the spray in a manner creating preferred visual enhancements, as discussed below. This is because the space helps facilitate generation of "fade" or uneven color distribution in those portions of the underlying blocks 22 to which contrast agent or colorant is applied. Also it can facilitate application of spray to selected end/side portions of blocks.

In a typical operation, using equipment as characterized in FIG. 4, the application of the contrasting agent will be a spray process, with the agent provided as a liquid solution or suspension. Typically, an aqueous-based composition will be used, although alternatives are possible. A spray head or application arrangement is indicated generally at 30, supported on a conveying arrangement 31 that can be used to move the applicator 30 across the stencil 25 with spray application of the contrasting agent.

Figure 5:
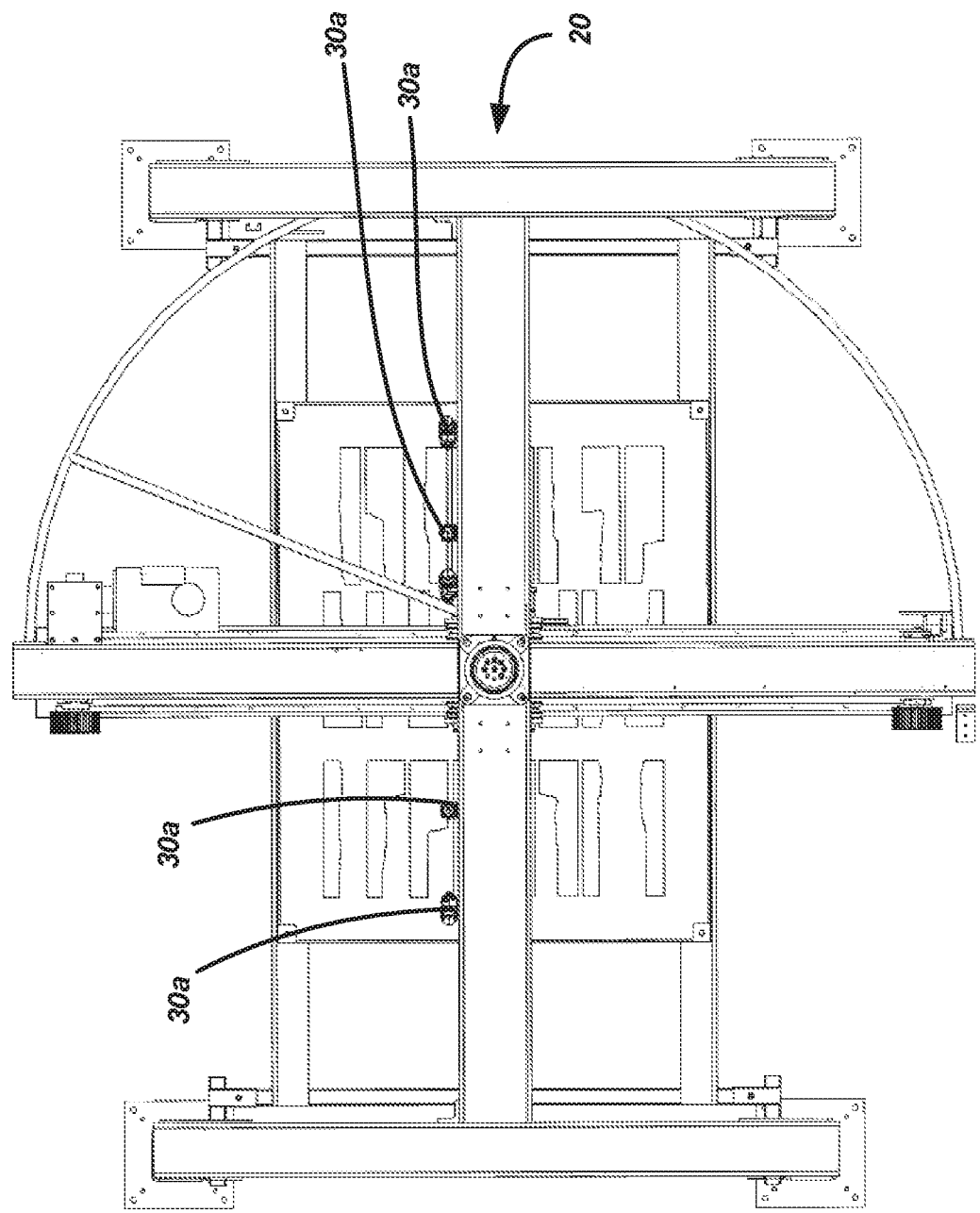
FIG. 5 is a schematic top plan view of the equipment and step of FIG. 4.

In FIG. 5, a top plan view of the arrangement 20 is depicted. The particular spray head or applicator 30 depicted comprises multiple nozzles (indicated generally at 30*a*) so that spraying can be where selected and at selected angles of direction, as referenced below.

Figure 6:
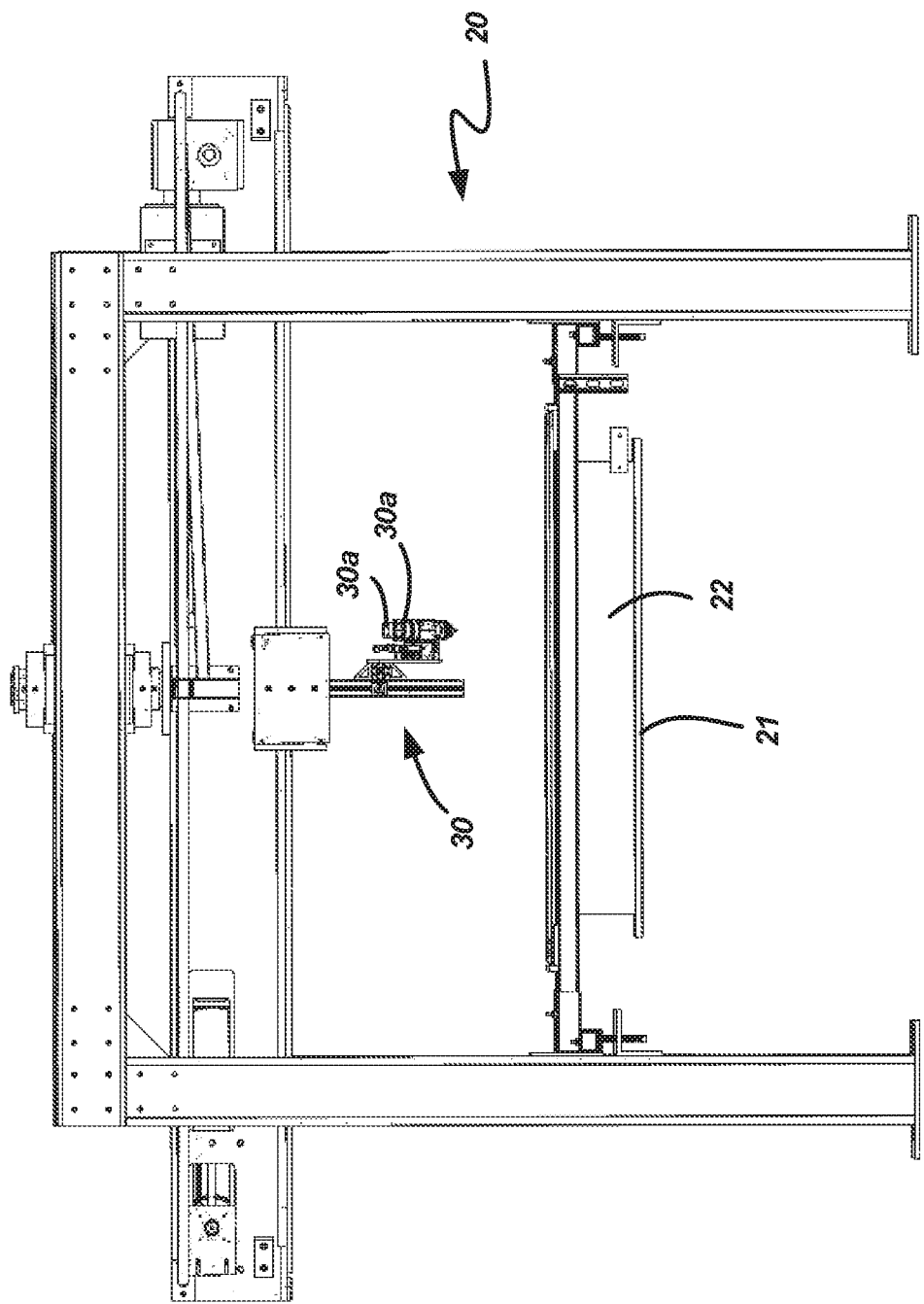
FIG. 6 is a schematic side perspective view of the equipment in the step of FIGS. 4 and 5.
Figure 7:
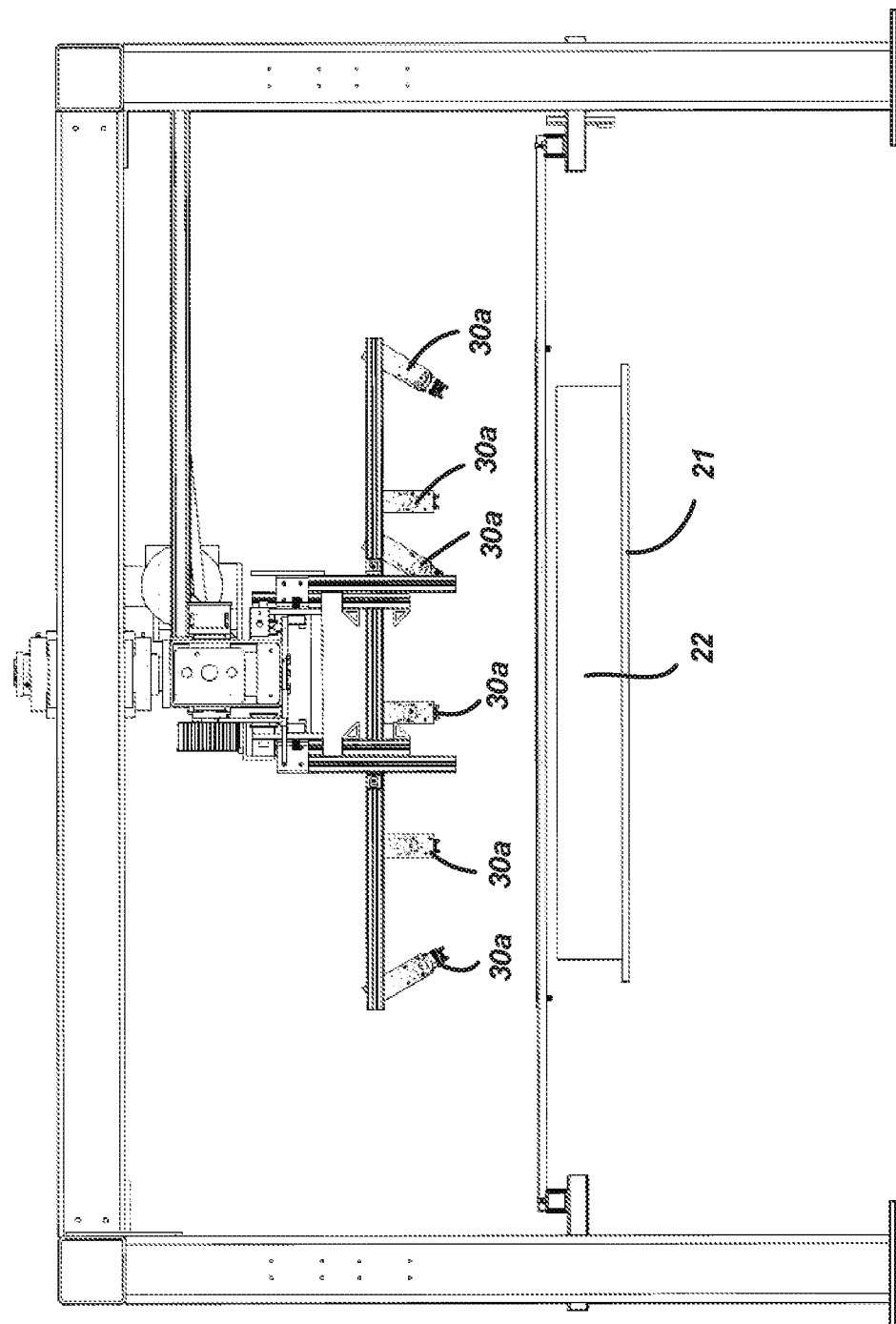
FIG. 7 is a schematic end perspective view at right angles to the view of FIG. 6.
Figure 8:
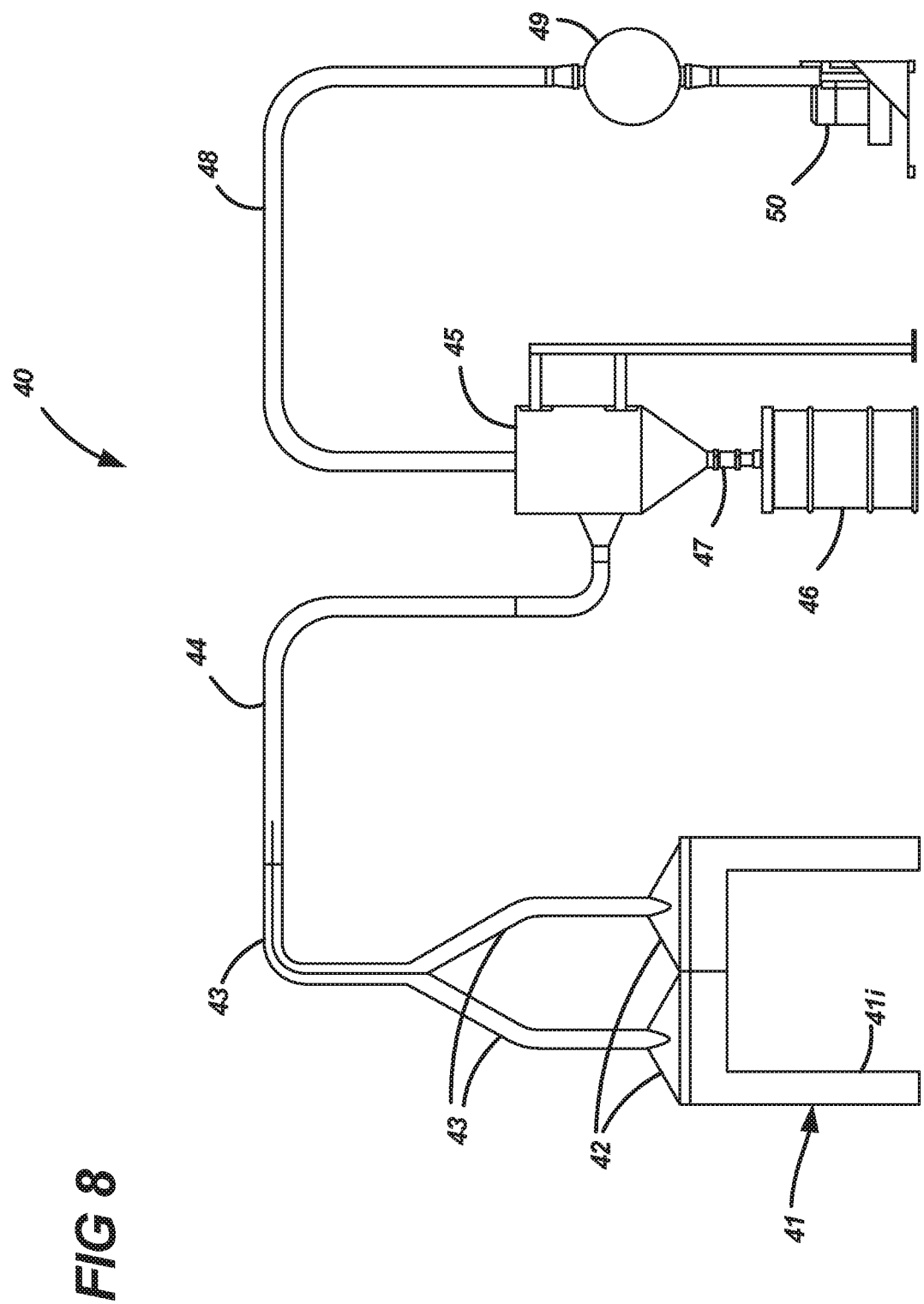
FIG. 8 is a schematic depiction of equipment for use in a step of overspray evacuation in a process according to the present disclosure.

In FIG. 6, a schematic end view of the equipment arrangement 20 is depicted, and in FIG. 7 a schematic side view at right angles relative to FIG. 6 is depicted. Referring to FIG. 7, it is noted that the particular array of spray nozzles 30*a* depicted optionally includes some nozzles that vary from one another at least in connection with the direction toward which the spray is applied. This can be used to obtain a variety of effects including spraying the side portions of underneath blocks; and/or to create a spray pattern that is uneven in the sections to which the spray is applied. This will help create fade or variation in these sections, and thus further enhance simulation of natural rock or stone in those locations. Although no particular theory is asserted, it is possible that the edges of the stencil 25 interact with the spray to deflect or bend the spray and resulting in the color variations including the fade.

Machine direction for the pallet to be moved into and out of the equipment 20 is not meant to be specifically indicated in FIGS. 4-7. A variety of arrangements are possible. Typically, however, the equipment is configured so that the pallet 21 of blocks 22 remains stationary during the application process, and it is the applicator 30 that is used moved during the process. The applicator 30 may also be rotated 90 degrees and spray the other direction across the conveyor. The direction of spray will depend on the product running and the orientation of the stencil 25.

It is noted that in FIGS. 4-7, a schematic depiction of a set of blocks 22 is provided. Individual blocks are not defined, although region 22 would generally comprise a plurality of spaced blocks as described.

Indexing of the pallet and block location relative to the apertures 26 and the stencil 25 is helpful to obtaining the desired effect. A variety of approaches can be used for this, for example including: equipment for adjusting the position of the stencil 25; and/or, equipment for adjusting the location of the pallet 21.

In some instances, it maybe the stencil 25 that will be located or adjusted in the equipment relative to the pallet 21, once the pallet 21 is moved into position, if any adjustment is needed for the particular application.

When the blocks 22 are done processing (both being cured and having the colorant applied, regardless of the order of steps), the finished and colored blocks can be stacked in layers on a pallet for shipping.

C. Control and Removal of Overspray

With a stencil operation, overspray lands on the surface 25*a* of the stencil (FIG. 4) facing the spray nozzles 30*a*. As that overspray builds up, it can coalesce and drip onto underlying blocks or other structure. It is desirable to remove that spray before such undesirable coalescing and dripping can occur. Typically, and preferably, overspray is removed by vacuum.

In FIG. 8, an example of equipment and process for removing overspray is depicted, schematically, at 40. Referring to FIG. 8, at 41 a hood is depicted with an internal space 41*i*. The hood depicted is a high velocity hood 42 of a type typically used in an industrial overspray removal operation. A vacuum is applied to the hood 42 through tubing sections 43, typically formed from flexible tubing. The tubing 43 then feeds the vacuum suction of material through rigid tube section 44 to a cyclonic separator 45, in which fallout material within the suctioned material is removed and directed to waste drum 46 through valve arrangement 47. Tubing section 48 directs the air and any remaining particulate through filter 49 to the vacuum 50. The equipment 40 can be set up in conjunction with the equipment 20, FIGS. 4-8, if desired. This will be typical and preferred, since it is preferable to remove the overspray on the stencil 25 between operations, without moving the stencil.

Removal of overspray can be conducted before the pallet 21 and blocks 22 are moved from underneath the stencil 25 or after. This will be a matter a choice for the facilities involved. Removal of overspray can also be done during the coloring process, as discussed in section E below. It may be desirable in some instances to remove the pallet 21 and blocks 22 from underneath the stencil 25 before the overspray is removed, so as to avoid the overspray removal operation inadvertently pushing collected liquid onto the blocks.

The process is automated, to be able to mass produce many blocks having a desired colorant applied. In a preferred process, colorant equipment station 20 is sized to process a "big board" machine pallet, and the cycle time for each pallet of blocks to be processed with the enhanced appearance techniques discussed herein is less than 90 seconds, often less than 60 seconds, preferably under 40 seconds, and most preferably under 25 seconds, so that it can "keep up" with the cycle time of the associated big board dry-casting machine. If sized for use with a smaller dry-casting machine pallet (such as, for example, that of a standard "3@Time" block machine), the cycle time of the equipment 20 can be commensurately faster. The cycle time of the automated colorization process would include the steps (in any order) of applying the colorant; moving the pallet from under the stencil (or moving the stencil from over the pallet); applying the overall sealer without pigment; removing the overspray; and positioning a new pallet of blocks relative to the stencil to begin the process again.

D. The Contrast Agent Application and Composition

Typically and preferably, the contrast agent is applied in an aqueous carrier, although alternatives are possible. The contrast can be provided by a variety of pigments carried within the composition. The pigments can be many different types. Preferably, the pigments comprise iron oxide. More preferably, the pigments consist essentially of iron oxide. In some examples, the pigments consist of iron oxide.

With iron oxide pigments, a wide variety of color effects are possible. They can range, for example, from fairly light cream color to very dark grey or black colors, with variations between such as rust or brown colors. Such iron oxide color pigments are well known and widely available, and can be incorporated in compositions according to the present disclosure. While alternate pigments can be used, iron oxides may be preferred as they are not only widely available but have proven characteristics in applications involving concrete.

The particular composition applied is a matter of choice. The techniques described herein can be satisfactorily conducted with the use of concrete seal compositions having pigment therein selected for the intended color or visual contrast effect. Formulators and/or suppliers of such compositions and from which useable compositions can be obtained include: ChemSystems, Houston, Tex. 77041; LM Schofield, Douglasville, Ga. 30134; Behr Corporation, Santa Ana, Calif. 92704; and Sherwin Williams, Cleveland, Ohio.

Many types of concrete sealer compositions can be used. Useful ones include a penetrating sealer. Types of penetrating sealers include silanes, siloxanes, silicates, siliconates, and blends or mixtures thereof. Preferred compositions include a blend of silane and siloxane.

Some more preferred compositions will be ones which include, as applied, a blend of silane/siloxane component and acrylic. The silanes/siloxanes are desirable in that they help facilitate composition penetration and retention in pores of the concrete block while leaving the applied face solution permeable to water vapor. The acrylic component generally facilitates suspension and distribution of the pigment, as well as adherence of the pigment to the silanes/siloxanes and the block.

Typically, compositions having greater than 50% silane/siloxane component relative to the percent of acrylic component by weight will be preferred. Preferably, compositions having greater that 60% silane/siloxane component to the percent of acrylic component by, will be preferred. More preferably, greater than 70% or greater than 80% silane/siloxane component relative to the acrylic component will be used. In some examples, about 90% silane/siloxane component relative to 10% acrylic component, will be preferred. The selected silanes/siloxanes and acrylics can be ones typical for concrete seal compositions.

It is noted that the applied composition will modify the characteristics of the concrete in the portions of the block to which it is applied. Since this can affect moisture (e.g. water vapor) transmission characteristics and related characteristics of the resulting block, it may be desirable to ensure that the resulting block is provided with a more even moisture barrier/transmission characteristic, by (after application of the color in one or more sections of the block), eventually providing an overall coating of sealer, for example a "clear" concrete sealer (sealer with no color pigment). This will be typical and preferred in many applications to the present techniques.

Again, techniques according to the present disclosure are meant to not only to create visual contrast or enhancement, but to enhance the appearance of the resulting block and wall structure with respect to emulation of a structure made from natural stone masonry. To facilitate this, it may be desirable to apply different amounts of pigment to different areas within a section to which colorant is being applied. This is because a natural stone piece would typically not have an even color appearance but rather would show some variation. By using a spray nozzle configuration with some overlapping fields of spray and variations and angle and amount etc., such effects can be obtained. Herein, again, uneven color appearance in an area which has received application of pigment, is sometimes referred to as "fade."

As indicated above, in some instances it is desirable to apply pigment to side portions of a block as well as (or alternatively to) the upward facing portion of the block. This will be useful for example if the block is molded with decorative features on the side, facilitating use of the block as a corner block. Angled nozzles can be used to apply spray to a side or side section. Such application is facilitated by using an "offsetting" stencil, as it allows for spray to be directed to under selected sections of the stencil as a result of angled nozzles and spray application.

E. The Embodiment of FIGS. 11-14

Figure 11:
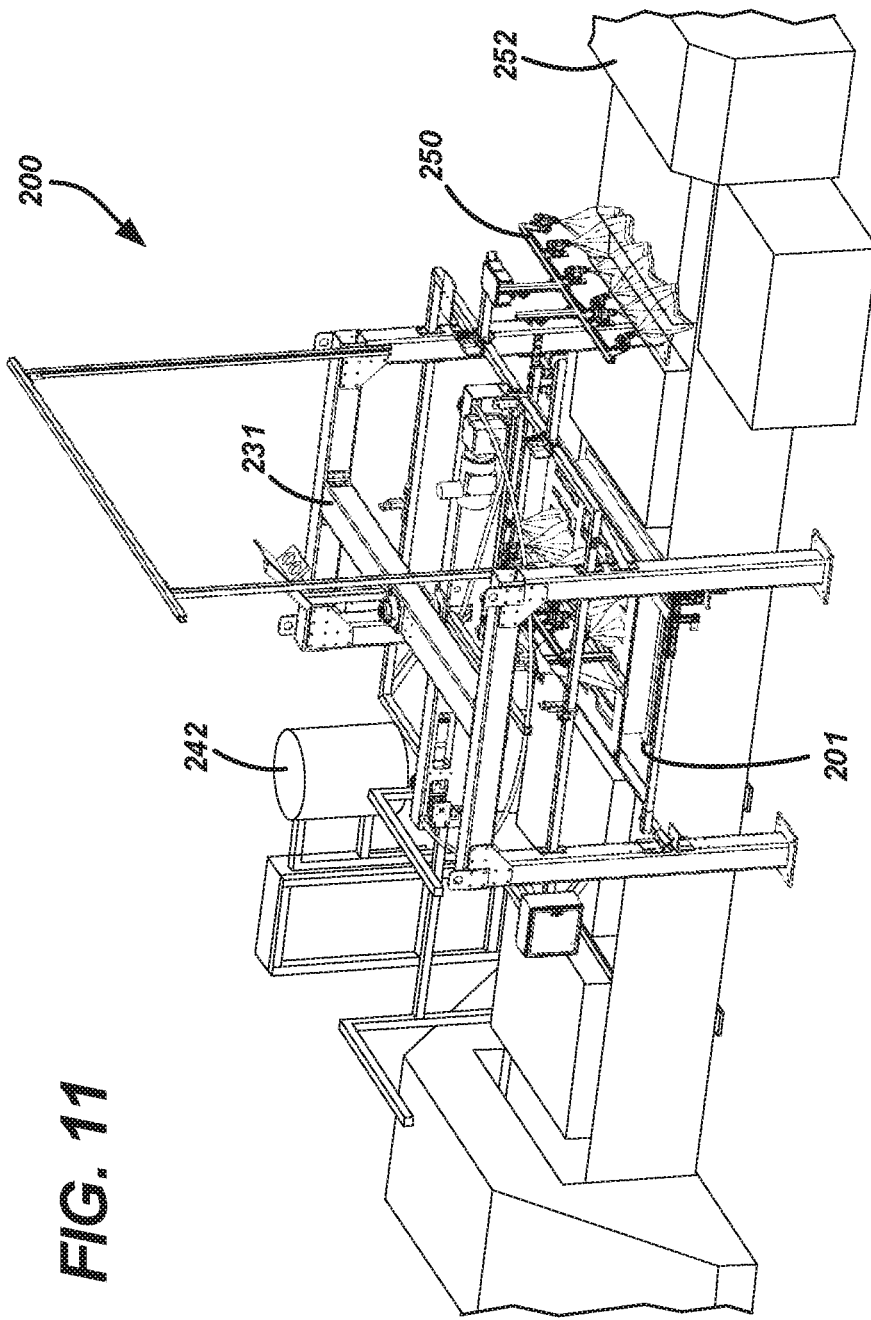
FIG. 11 is a perspective view of another embodiment of the equipment depicting a step in a process of providing an enhanced block in accord with the techniques of the present disclosure.
Figure 12:
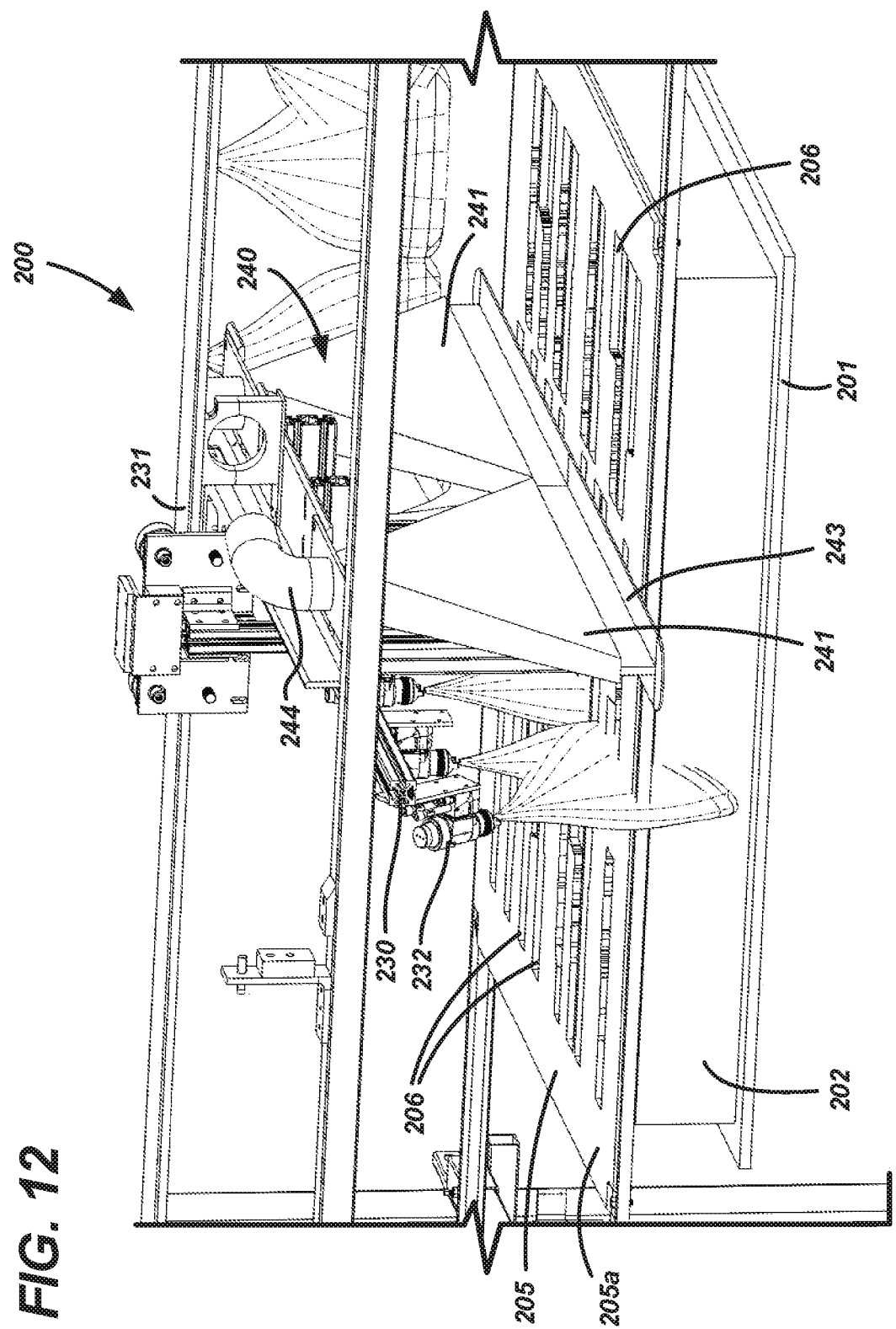
FIG. 12 is an enlarged perspective view of a portion of the equipment of FIG. 11.
Figure 13:
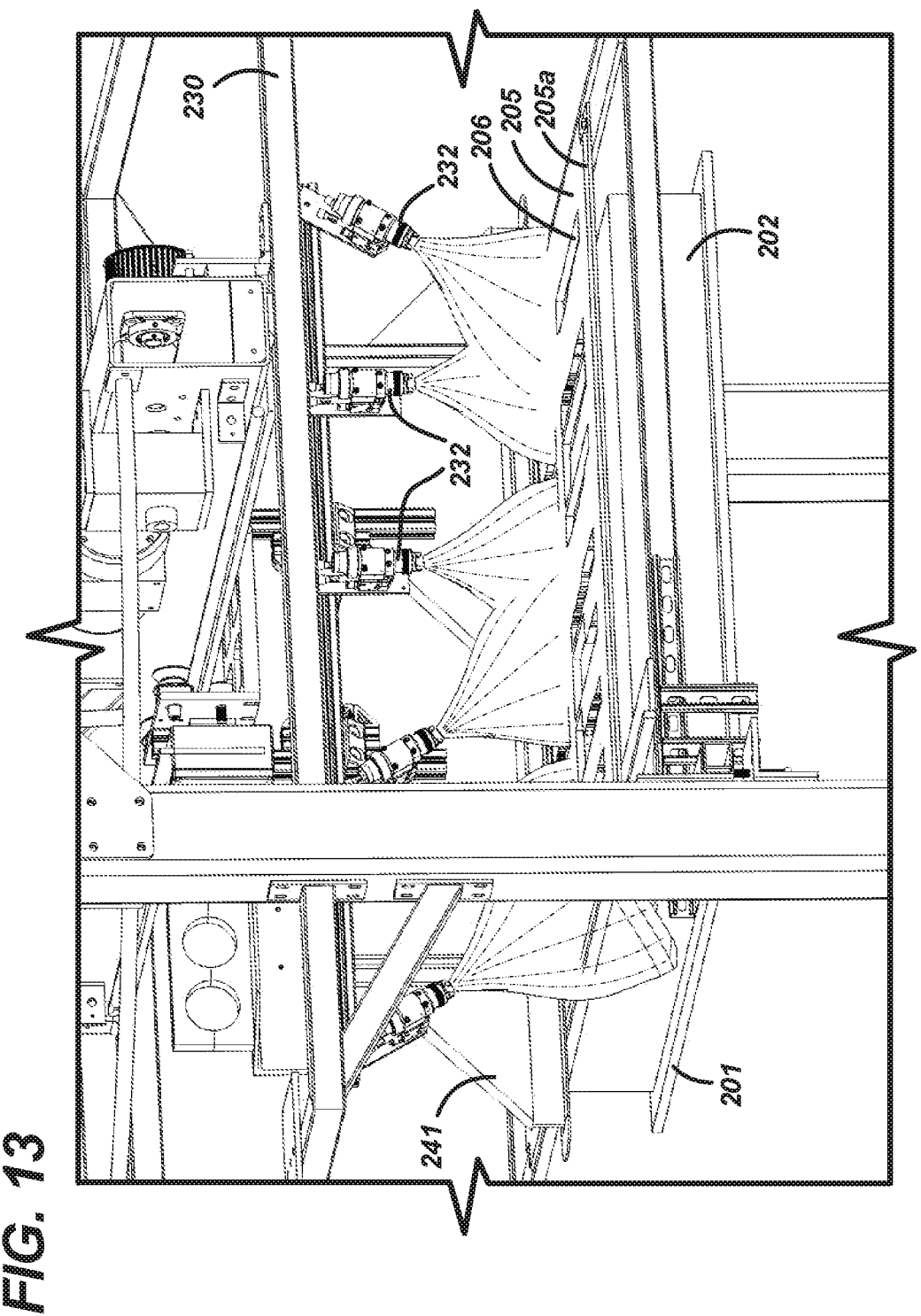
FIG. 13 is another perspective view of the portion of the equipment shown in FIG. 12.

FIGS. 11-14 depict another embodiment of processing equipment for applying visual contrast agent to a decorative surface of blocks in a typical block manufacturing process. The equipment is indicated generally at 200. In FIGS. 11-13 a pallet 201 of a plurality of, individual, molded blocks 202 is depicted, schematically. Individual blocks are not defined, although reference number 202 would generally comprise a plurality of spaced blocks as described. The pallet 201 with multiple blocks 202 thereon could have been molded in a molding process of a type typical for dry-cast decorative blocks, see for example U.S. Pat. No. 8,128,851. Individual blocks 202 would be positioned on the pallet 201 with the front, decorative, faces of each block directed upwardly. The pallet 201 would typically have been moved using equipment not depicted, from a molding operation to the equipment 200 for application of the visual contrasting agent. The process can be conducted "in line" in an assembly operation with green blocks and conveying equipment used to move the pallet 201. Blocks 202 may also be cured blocks with the colorization process being conducted "in line" or "off line", depending on the system developed.

Control of the application of the contrast agent, is provided, in part, by a stencil arrangement 205. The stencil arrangement 205 has various apertures 206 therein, at desired locations where contrast agent is meant to reach selected portions of underlying blocks 202. Solid portions of the stencil 205, then, are surfaces where applied agent would not reach the block, but rather will be retained on the stencil 205. In some alternative processes, the stencil may be omitted. When the stencil is omitted, entire faces can have colorant applied, and can include techniques to achieve, for example, a fade across the surface of the block face.

As indicated previously, typically and preferably the stencil process will involve use of an "offset stencil". By the term "offset" and its context, it is meant that the stencil 205 is not in contact with the individual blocks 202 underneath. Providing space can facilitate application of spray to selected side portions of blocks. While many variations can be used, in typical processes, a distance of the offset, as measured from the bottom face of the stencil 205 to the top of the highest block 202 is usually more than $1/10^{th}$ of an inch and no greater than 1 inch, preferably about $3/8^{th}$ inch.

In a typical operation, using equipment as illustrated in FIGS. 11-13, the application of the contrasting agent will be a spray process, with the agent provided as a liquid solution or suspension. Typically, an aqueous-based composition will be used, although alternatives are possible. A spray head or application arrangement is indicated generally at 230, supported on a conveying arrangement 231 that can be used to move the applicator 230 across the stencil 205 with spray application of the contrasting agent.

In FIG. 13, the spray head or applicator 230 can be seen as comprising multiple nozzles (indicated generally at 232) so that spraying can be where selected and at selected angles of direction, as referenced below.

Still in reference to FIG. 13, it is noted that the particular array of spray nozzles 232 depicted optionally includes some nozzles that vary from one another at least in connection with the direction toward which the spray is applied. This can be used to obtain a variety of effects including spraying the side portions of underneath blocks; and/or to create a spray pattern that is uneven in the sections to which the spray is applied. This will help create fade or variation in these sections.

Machine direction for the pallet to be moved into and out of the equipment 20 is not meant to be specifically indicated in FIGS. 11-13. A variety of arrangements are possible. Typically, however, the equipment is configured so that the pallet 201 of blocks 202 remains stationary during the application process, and it is the applicator 230 that is moved during the process. The applicator 230 may also be moved in a direction 90 degrees from the direction of movement shown in FIGS. 11-13.

Indexing of the pallet and block location relative to the apertures 206 and the stencil 205 is helpful to obtaining the desired effect. A variety of approaches can be used for this, for example including: equipment for adjusting the position of the stencil 205; and/or, equipment for adjusting the location of the pallet 201.

In some instances, it maybe the stencil 205 that will be located or adjusted in the equipment relative to the pallet 201, once the pallet 201 is moved into position, if any adjustment is needed for the particular application.

When the blocks 202 are done processing (both having colorant applied and being cured, regardless of the order of steps), the finished and colored blocks can be stacked in layers on a pallet for shipping.

With a stencil operation, overspray lands on the surface 205a of the stencil facing the spray nozzles 232. As that overspray builds up, it can coalesce and drip onto underlying blocks or other structure. It is desirable to remove that spray before such undesirable coalescing and dripping can occur. Typically, and preferably, overspray is removed by vacuum.

Figure 14:
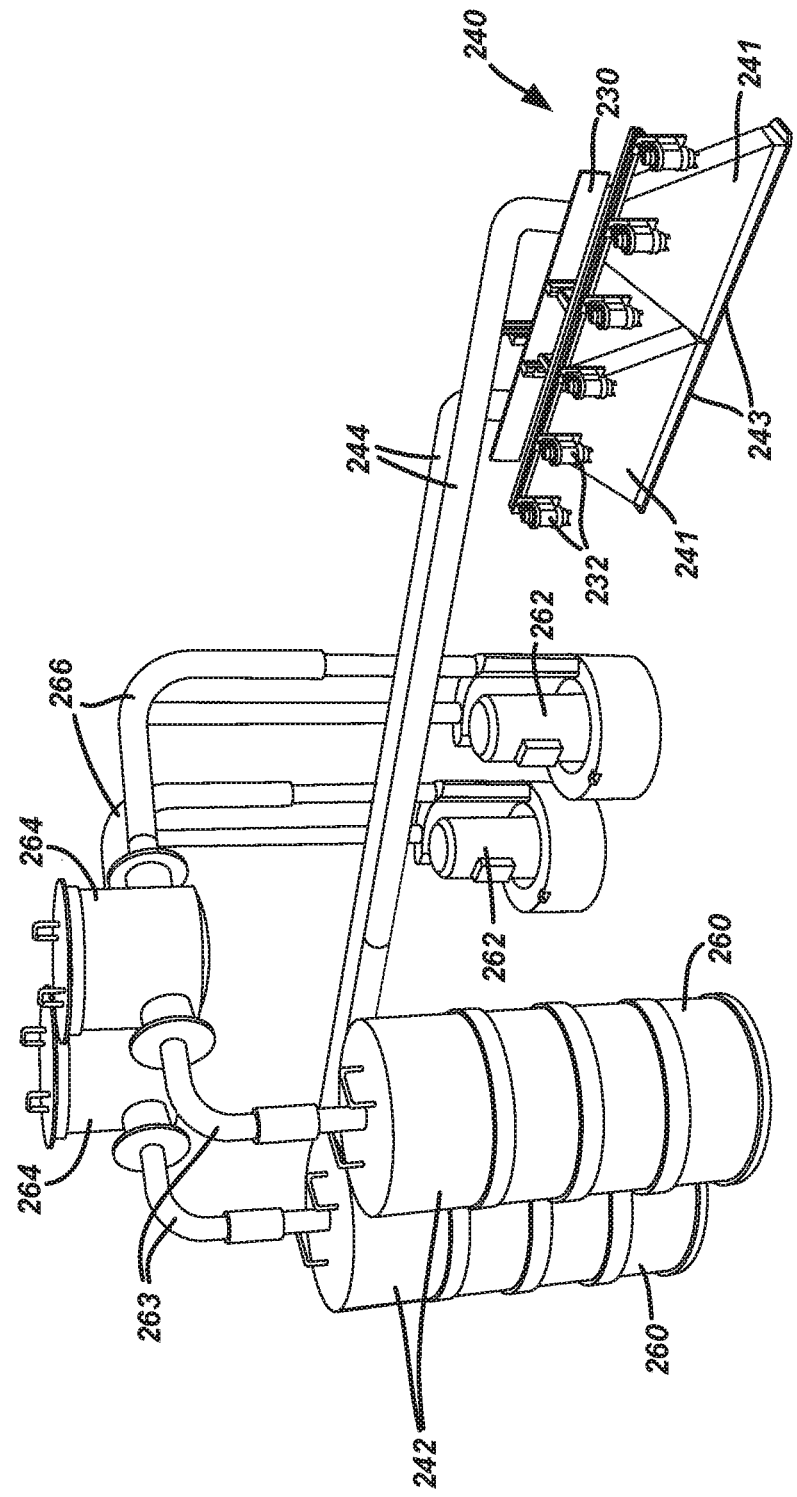
FIG. 14 is another schematic depiction of equipment for use in a step of overspray evacuation in a process according to the present disclosure.

In FIG. 12, an example of equipment and process for removing overspray is depicted. The equipment and process for overspray removal is shown schematically in FIG. 14. Referring to FIGS. 12 and 14, a hood arrangement 240 is depicted and used for overspray removal operation. Vacuum pressure is applied to the hood arrangement 240 from equipment such as a vacuum system cyclonic separator 242 (FIG. 11) through tubing sections 244.

In this embodiment, removal of overspray can be conducted during the coloring process, as the hood arrangement 240 will typically be moved across the stencil 205 following the spray applicator 230. In some example processes, the hood arrangement 240 has more than one hood 241. Two hoods 241 are depicted in FIG. 14. Each hood 241 can have a mouth 243 that faces the stencil 205 and allows overspray that has collected on the stencil surface 205a to flow through. In some example processes, the hood arrangement 240 follows the spray applicator 230 in one direction, and then moves the opposite direction again across the stencil 205. The mouth 243 of the hood 241 can be spaced from (above) the stencil surface 205a while moving in both directions, or one edge may be against the stencil surface 205a while moving in only a single direction or in both directions. In one example process, the mouth 243 of the hood 241 has one edge against the stencil surface 205a, with the other edge spaced from the stencil surface 205a, such that in one direction, the leading edge of the mouth 243 is spaced above the stencil surface 205a with the trailing edge against the stencil surface 205a to allow the overspray to be drawn into the interior of the hood 241.

In the process of FIG. 14, the overspray is drawn into the mouth 243 of each hood 241 and conveyed through the tubing 244. The cyclonic separators 242 separate the colorant from the air. The separated colorant is collected in the storage drums 260, while the separated air and any remaining particulate (including any remaining colorant particles) is drawn by vacuums 262 through hose 263 and into a filtration system 264. The filtration system 264 operates as safety filters to separate out additional particulate from the air. The filtered air then flows from the filtration system 264 through additional hose 266 and into the vacuums 262.

In reference again to FIG. 11, the equipment 200 shows a sealer applicator 250. The sealer applicator 250 sprays a sealer onto the blocks 202 after the blocks 202 have had the colorant applied. After the sealer is applied, the blocks 202 are conveyed into an oven 252 for curing.

As previously discussed, many types of concrete sealer compositions can be used. Useful ones include a penetrating sealer. Types of penetrating sealers include silanes, siloxanes, silicates, siliconates, and blends or mixtures thereof. Preferred compositions include a blend of silane and siloxane. Some more preferred compositions will be ones which include, as applied, a blend of silane/siloxane component and acrylic. The silanes/siloxanes are desirable in that they help facilitate composition penetration and retention in pores of the concrete block while leaving the applied face solution permeable to water vapor. The acrylic component generally facilitates suspension and distribution of the pigment, as well as adherent of the pigment to the silanes/siloxanes and the block.

Typically, compositions having greater than 50% silane/siloxane component relative to the percent of acrylic component by weight will be preferred. Preferably, compositions having greater that 60% silane/siloxane component to the percent of acrylic component by, will be preferred. More preferably, greater than 70% or greater than 80% silane/siloxane component relative to the acrylic component will be used. In some examples, about 90% silane/siloxane component relative to 10% acrylic component, will be preferred. The selected silanes/siloxanes and acrylics can be ones typical for concrete seal compositions.

III. Additional Comments Regarding Contrast Use and Application

A. Preferred Block Surface Structural Variation

Techniques according to the present disclosure can be applied to a wide variety of block and block types. However, when the object is to simulate stone masonry, certain features will be preferred.

First, it will be particularly preferred that in the portions of the block intended to simulate "mortar", (e.g. grooves 2g FIG. 1), the grooves will typically be at least 0.25 inch (6 mm) wide and at least 0.5 inch (13 mm) deep; preferably at least ⅜ inch (19 mm) wide and 0.75 inch (19 mm) deep. Also, an overall false stone surface section defined by one or more of surface sections 2a, 2b, 2c and 2d, can have uneven surface features or non-planar topography, with a minimum peak to depth variation in the section of at least 5 mm, often at least 10 mm and sometimes 20 mm or more (disregarding pores). The surface sections 2a, 2b, 2c, and 2d can also be smooth surfaces.

B. Variations in Spray Applications, Equipment; Formulation

As indicated previously, stone emulation is facilitated by having uneven spray application with a generation of "fade" as described. In some instances, multiple applications or layers of contrast or color agent in selected portions, but not in others, can be used to facilitate the desired variation in appearance.

It is possible to use the techniques described herein with multiple colorant applications to the same block or block set, involving steps of different stencil use. Thus one stencil could be used for certain sections of the blocks, with a second stencil used in a second application process to coat other sections of the same block, but with a different colorant or color effect.

Spray equipment and component commercial availability can be adapted to processes according to the present disclosure. Usable such spray equipment including nozzles and other features, can be obtained from such companies as Graco, Minneapolis, Minn. 55413; and Spray Systems, Minneapolis, Minn. 55345.

As to the application composition, a variety of formulations can be used. Typically, the amount of water will be that sufficient to obtain desired consistent spray application for the intended materials. Usually, not substantially more water than what accomplishes this will be preferred, to facilitate drying.

Adjuvants can be included in the composition having the adherent and pigment therein. For example, addition of a pseudo-plastic thickener to increase the viscosity of the liquid when sheer is applied may be desired.

A fluoropolymer/silicone material can be included to increase water and stain repellency. These materials may also enhance the color of the substrate and reduce efflorescence (white color seen on may brick and masonry building from natural salt carried to the surface of the block by water vapor).

In some instances, a biocide may be incorporated to inhibit growth of mold on or in the block. Also a wetting agent can be used to increase penetration of the applied material into the surface of the block.

Such material will be a matter of preference for the particular application involved, and do not necessarily specifically concern the generation of simulated stone appearance by application of color, but rather desirable factors concerning application capability and/or wear.

IV. Additional Information

Although the preferred processes described herein are for molded concrete units, it should be understood that the concepts used for these processes need not be limited to "molded" units. Indeed, the concrete units can be made using other processes, such as extruding, using concrete presses, or printing with a 3-D printer. After the concrete units are set but before they are hard in final, useable form (referred to herein as "pre-final concrete units"), they may be cured. The pre-final concrete units may have colorant applied using the equipment and processes as described above in connection with FIGS. 4-8 and 11-14.

Furthermore, although the preferred processes described herein frequently refer to dry-cast concrete, it is envisaged that the processes of FIGS. 4-8 and 11-14 can be applied to other types of concrete, including wet-cast concrete.

The equipment and processes described above, and shown in FIGS. 4-8 and 11-14 can be applied to articles and objects other than concrete units. The method includes color at least a portion of a surface of the object by orienting a stencil having openings above and spaced from the object; and then applying colorant to a portion of the surface by dispersing the colorant through the openings in the stencil and onto the object.

V. General Principles

As described herein, molded units of uncured concrete (typically dry-cast concrete) can be made to include at least one surface portion bearing a colorant, wherein the colorant comprises a sealer in liquid form.

The uncured dry-cast concrete block body, in many example embodiments, has opposite upper and lower faces and a plurality of sides extending between the upper and lower faces; and the at least one surface portion includes a portion of the upper face.

The at least one surface portion bearing the colorant, in many embodiments, includes a portion of the upper face and a portion of at least one of the sides.

The colorant can be visually distinct from a base color of the at least one surface portion of the uncured dry-cast concrete block body after exiting a mold.

The uncured dry-cast concrete block body, in some examples, is a green retaining wall block having opposite front and rear faces, opposite top and bottom faces between the front and rear faces, and opposite side faces between the front and rear faces and top and bottom faces, and wherein the upper face of the green block body is the front face of the retaining wall block in use; and the lower face of the block body is the rear face of the retaining wall block in use.

In embodiments that include a green retaining wall block, the retaining wall block can have a set back projecting lip.

In some example embodiments, the upper face of the uncured dry-cast concrete block body includes a plurality of sections separated by recesses, the sections and recesses having the appearance of individual stones separated by joints.

In examples using an upper face with a plurality of sections separated by recesses, the at least one surface portion bearing the added colorant includes at least a first one of the sections; the first one of the sections being completely covered by the added colorant.

The at least one surface portion bearing the added colorant may also include at least a second one of the sections; the second one of the sections being completely covered by the colorant that provides the second one of the sections with a visually distinct color appearance from the first one of the sections.

A method for coloring at least a portion of a surface of a molded unit of uncured dry-cast concrete is provided. The method includes applying colorant to a surface portion of the molded unit of uncured dry-cast, after the unit has been cast; the colorant comprising sealer in liquid form.

The step of applying a colorant preferably includes using an automated spray head to disperse liquid sealer comprising the colorant onto selected portions of the molded unit of uncured dry-cast concrete.

The method further includes orienting a stencil having openings above and spaced from the surface portion of the molded unit of uncured dry-cast concrete; and wherein the step of applying a colorant includes moving the spray head over the stencil to disperse the liquid sealer with the colorant through the openings in the stencil and onto the molded unit.

The molded unit of uncured dry-cast concrete can include opposite upper and lower faces and a plurality of sides extending between the upper and lower faces; and the step of applying a colorant includes applying the colorant to at least a portion of the upper face.

The step of applying a colorant may include applying the colorant to at least one of the plurality of sides.

In some examples, the upper face includes a plurality of sections separated by recesses; the sections and recesses having the appearance of individual stones separated by joints; and the step of applying a colorant includes applying the colorant to at least a first one of the sections, the first one of the sections being completely covered by the colorant.

In some examples, the step of applying the colorant includes applying colorant to at least a second one of the plurality of sections, the second one of the sections being completely covered by the added colorant, in a manner providing a visual color different from the first one of the sections.

In some preferred example methods, the method further includes orienting a stencil above and spaced from the molded unit; and wherein the step of applying a colorant includes applying liquid sealer having colorant through on or more openings in the stencil onto the first one of the sections, the stencil blocking the colorant from being applied onto selected other portions of the molded unit.

The step of applying a colorant can include applying the liquid sealer having the colorant through one or more openings in the stencil onto a second one of the sections, the colorant on the second one of the sections being a different color than the colorant applied to the first section.

The step of applying a colorant can include using an automated spray head to disperse the liquid sealer with the colorant onto one or more portions of the molded unit that are exposed by the stencil, the exposed one or more portions including at least the first section.

The method may further include providing a plurality of molded units of uncured dry-cast concrete; each unit resting on a lower surface and having an opposite upper surface; orienting a stencil above and spaced from the upper surfaces, the stencil having openings exposing selected portions of the molded units of uncured dry-cast concrete; and spraying a liquid sealer having a colorant through the openings of the stencil to color the exposed selected portions of the molded units of uncured dry-cast concrete.

The step of spraying preferably includes dispensing the liquid sealer with the colorant through a spray head and moving the spray head over the openings in the stencil.

The step of spraying may include dispensing one or more colorants through a plurality of spray heads and moving the plurality of spray heads over the stencil from a first end of the stencil toward a second, opposite end of the stencil.

In preferred methods, the method further includes after the step of spraying, removing overspray from the stencil.

The step of removing overspray can include using suction above the stencil to vacuum up overspray.

The step of spraying can include applying the colorant to at least portions of the upper faces of the molded units as uncured dry-cast concrete.

The step of spraying can include applying the colorant to at least portions of some sides of the molded units of uncured dry-cast concrete.

The step of providing of molded units may include providing a plurality of molded units of uncured dry-cast concrete on a pallet; and the method further includes after the step of removing overspray, moving the pallet of units to a curing station; providing a second pallet of molded units of uncured dry-cast concrete; and dispensing one or more colorants in a liquid sealant through the plurality of spray heads to cover selected portions of the molded units on the second pallet with colorant, while blocking remaining portions of the units from colorant with the stencil.

The method may further include, after the step of dispensing, removing overspray from the stencil; moving the second pallet of blocks to the curing station; and repeating a process of providing another pallet of molded units of uncured dry-cast concrete, dispensing one or more colorants to molded units on said another pallet, removing overspray from the stencil, and moving said another pallet to the curing station.

In some example methods, the step above of "repeating a process" is completed in under 25 seconds.

In another aspect, a concrete block is provided made according to the method as generally characterized above.

In another aspect, a predecessor to a concrete unit includes a molded mass of uncured dry-cast concrete of a first color appearance; and a layer of sealing agent of a second color appearance extending over a selected portion of the surface of the molded mass.

The molded mass, in many embodiments, includes upper and lower faces and a plurality of sides between the upper and lower faces; and wherein the selected portion having the layer of sealing agent of a second color appearance is on the upper face.

In many embodiments, the selected portion having the layer of sealing agent of a second color appearance is on a portion of the upper face and a portion of at least one of the sides.

In some examples, the upper face includes a plurality of sections separated by recesses the sections and recesses having the appearance of individual stones separated by joints.

In examples including the upper face having a plurality of sections separated by recesses the sections and recesses having the appearance of individual stones separated by joints, the selected portion having the layer of sealing agent of a second color includes at least a first one of the sections, the first one of the sections being completely covered by the second color appearance.

In some examples, at least a second one of the sections is completely covered a layer of sealing agent of a third color appearance that is a different from the first color appearance and the second color appearance.

In another aspect, a molded concrete block is provided. The block includes a dry cast concrete block having, when oriented in use, opposite front and rear faces; opposite top and bottom faces extending between the front and rear faces; and opposite side faces extending between the front and rear faces and the top and bottom faces; the front face having a plurality of visually distinct face portions, each visually distinct face portion emulating a face of a discrete stone place and being delineated from an adjacent distinct face portion by a recess emulating a joint; and at least one of the visually distinct face portions bearing a base color enhanced by additional color to result in each visually distinct face portion being a visually different color from at least one other distinct face portion on the front face.

In example embodiments, each of the recesses has a width of not less than about 3/8ths inch and a depth of 1/2-1 inch.

In some implementations, each visually distinct face portion is a visually different color from every other visually distinct face portion of the front face.

The block, in some examples, can further including a set back lip projecting from the bottom face.

A pallet of the molded concrete blocks, as characterized above, can be provided. On the pallet will be the molded concreted blocks stacked in multiple layers, with each block resting on the rear face.

In another aspect, a molded concrete block is provided including a dry cast concrete block having a face with a plurality of false stones separated by false joints; and at least a first false stone being visually distinct from at least one other false stone by a pigment applied to the first false stone after molding the block.

The first false stone can have a fade across the surface thereof.

In some embodiments, at least a second false stone has a visually distinct appearance from at least one other false stone by pigment applied to the second false stone. In such embodiments, the pigment on the first false stone is the same as on the second false stone. Alternatively, in such embodiments, the pigment on the first false stone is different than the pigment on the second false stone.

The block preferably includes a coating of a non-pigmented sealer on the entire face.

In another aspect, a pre-final concrete unit comprises a set and undried concrete block body having at least one surface portion bearing an added colorant; the added colorant resulting from addition of a sealer in liquid form to the at least one surface portion.

The block body can have opposite upper and lower faces and a plurality of sides extending between the upper and lower faces; and the at least one surface portion can include a portion of the upper face.

The at least one surface portion bearing the colorant can include a portion of the upper face and a portion of at least one of the sides.

A coating of a non-pigmented sealer can be on an entire face of the unit.

In another aspect, a method for coloring at least a portion of a surface of a pre-final concrete unit comprises applying colorant to a surface portion of the unit of set and undried concrete; the colorant comprising sealer in liquid form.

The step of applying a colorant can include using an automated spray head to disperse liquid sealer comprising the colorant onto selected portions of the unit.

The method may further include orienting a stencil having openings above and spaced from the surface portion of the unit; and the step of applying a colorant includes moving the spray head over the stencil to disperse the liquid sealer with the colorant through the openings in the stencil and onto the unit.

In another aspect, a method for coloring at least a portion of a surface of an object comprises orienting a stencil having openings above and spaced from the object; and applying colorant to a surface portion of the object by dispersing the colorant through the openings in the stencil and onto the object.

The step of applying a colorant may include using an automated spray head to disperse a liquid comprising the colorant onto selected portions of the object.

The step of spraying may include dispensing the liquid with the colorant through a spray head and moving the spray head over the openings in the stencil.

The step of spraying may include dispensing one or more colorants through a plurality of spray heads and moving the plurality of spray heads over the stencil from a first end of the stencil toward a second, opposite end of the stencil.

The method can include a step of removing overspray from the stencil.

The step of removing overspray may include using suction above the stencil to vacuum up overspray.

The step of removing overspray may be conducted during the step of applying colorant.

The step of removing overspray may be conducted after the step of applying colorant.

The step of applying colorant to a surface portion of the object may applying colorant to a surface portion of a concrete unit.

The step of applying colorant to a surface portion of the object may include applying colorant to a surface portion of a molded unit of uncured dry-cast concrete.

The above includes example principles. Many embodiments can be made using these principles.

What is claimed is:

1. A method of enhancing the color appearance of a selected face portion of each of a plurality of articles of hardened concrete mass-produced on a production line for mass producing a plurality of hardened concrete articles, the production line comprising (i) a mixing station adapted to mix suitable ingredients with water to prepare a batch of unhardened concrete material suitable for dry casting, (ii) a molding station adapted to dry cast a body having top face portions and side face portions and comprising a densified quantity of the unhardened concrete material, (iii) a curing station adapted to stage the dry-cast body under conditions suitable to facilitate hardening of the concrete material, and (iv) a packaging station, wherein the method comprises the steps of:
   a) providing a stencil comprising a solid portion and a first open portion;
   b) providing a first surface colorant in a liquid carrier;
   c) after dry casting the body, and before transporting the unhardened dry-cast body to the curing station, positioning the stencil above and spaced from the top face portions of the unhardened dry-cast body such that the first open portion of the stencil is aligned with a first selected face portion of the unhardened dry-cast body and the solid portion of the stencil is aligned with other face portions of the unhardened dry-cast body;
   d) after the stencil and the unhardened dry-cast body are positioned and aligned, spraying the first surface colorant in its liquid carrier from above the stencil and toward the unhardened dry-cast body in such a manner that some of the first surface colorant in its liquid carrier passes through the first open portion of the stencil and onto the first selected face portion of the unhardened dry-cast body and some of the first surface colorant in its liquid carrier is blocked by the solid portion of the stencil from reaching other face portions of the unhardened dry-cast body, and in such a manner that the color appearance of the first selected face portion of the unhardened dry-cast body is differentiated from the color appearances of other face portions of the unhardened dry-cast body by the amount of the first surface colorant in its liquid carrier sprayed through the first open portion of the stencil and onto the respective face portions;

e) after the spraying step, transporting the surface color-differentiated unhardened dry-cast body to the curing station and staging it there until hardening of the concrete material comprising the dry-cast body has been obtained, so as to produce an article of hardened concrete having an enhanced surface color appearance;

f) placing the hardened article on a shipping pallet; and g) wherein the stations of the production line are adapted to perform their respective functions cyclically in preselected cycle times, and steps c) and d) are performed in-line and rapidly enough to keep up with the preselected cycle time of the molding station's production of dry-cast bodies.

2. The method of claim 1 further comprising the step of removing overspray of the surface colorant in its liquid carrier from the solid portion of the stencil after the spraying step and before the next performance of the spraying step.

3. The method of claim 1 wherein the surface colorant comprises pigment and the liquid carrier comprises a liquid that is suitable for penetrating and sealing the surface of a dry-cast concrete article.

4. The method of claim 1 wherein the spraying step comprises passing the surface colorant in its liquid carrier through a spray head comprising a nozzle.

5. The method of claim 1 wherein the stencil and the dry-cast body are both stationary while the spraying step is performed.

6. The method of claim 5 wherein, during the spraying step, the spray nozzle is moved relative to the stationary stencil and the stationary dry-cast body.

7. The method of claim 1, wherein the dry casting body is made on a machine pallet.

8. The method of claim 7, wherein the positioning, spraying, transporting and curing steps are performed on the unhardened dry-cast body after it has been demolded and while it is supported on the machine pallet.

9. The method of claim 1 wherein:
more than one surface colorant in a liquid carrier is provided, and each surface colorant in its liquid carrier has a different color appearance; and the stencil is provided with more than one open portion; and the positioning and spraying steps are performed in such a manner as to create a plurality of selected face portions of the unhardened dry-cast body that are differentiated in their respective color appearances as a result of the amounts of the different surface colorants in their respective liquid carriers sprayed through the openings in the stencil and onto each of the plurality of selected face portions.

10. The method of claim 9 wherein a plurality of the selected face portions are top face portions, each of which comprises a different decorative profile simulating a decorative aspect of masonry.

11. The method of claim 10 wherein the different simulated decorative aspects of masonry each comprise a different simulated decorative aspect of natural stone masonry.

12. The method of claim 11 wherein at least one of the different simulated decorative aspects of natural stone masonry comprises at least a portion of a mortarless joint between stones.

13. The method of claim 9 wherein at least one of the selected face portions is a side face portion.

14. The method of claim 1 wherein:

each cycle of the molding station produces a plurality of unhardened dry-cast bodies, the stencil comprises a plurality of first open portions, the stencil positioning step includes suitably aligning each of a plurality of the first open portions with the first selected top face portion of a different one of the plurality of unhardened dry-cast bodies, and the spraying step includes spraying the first surface colorant in its liquid carrier through the plurality of aligned first open portions of the stencil onto the selected plurality of first top face portions of the unhardened dry-cast bodies.

* * * * *